United States Patent [19]
Griffiths et al.

[11] 3,940,794
[45] Feb. 24, 1976

[54] STACKED FLEXIBLE RECORD DISK STORAGE APPARATUS HAVING ENHANCED DISK SEPARATION

[75] Inventors: Donald E. Griffiths, Longmont, Colo.; Joseph H. Koestner, Hope Well Junction, N.Y.; David G. Norton, Boulder, Colo.

[73] Assignee: International Business Machines Corporation, Armonk, N.Y.

[22] Filed: June 19, 1974

[21] Appl. No.: 480,990

[52] U.S. Cl. .................. 360/99; 360/86; 360/98; 360/105; 360/135
[51] Int. Cl.².. G11B 5/82; G11B 25/04; G11B 5/54
[58] Field of Search ........... 360/99, 98, 86, 97, 135, 360/102–, 103, 105; 346/137

[56] References Cited
UNITED STATES PATENTS

| | | | |
|---|---|---|---|
| 3,317,903 | 5/1967 | Eckert et al. | 360/98 |
| 3,509,553 | 4/1970 | Krijnen | 360/98 |
| 3,703,713 | 11/1972 | Pohm et al. | 360/99 |
| 3,731,292 | 5/1973 | Kelly | 360/130 |
| 3,838,462 | 9/1974 | Barbeau et al. | 360/99 |
| 3,852,820 | 12/1974 | Barbeau et al. | 360/99 |

*Primary Examiner*—Alfred H. Eddleman
*Attorney, Agent, or Firm*—Herbert F. Somermeyer

[57] ABSTRACT

A signal storage apparatus employs a stack of circular record disks accessible by axially separating segments of selected disks in the stack. One disk in a stack of coaxial rotatable circular compliant record disks is accessed with a minimum energy imparted to such disks by a chord roll disk separator. In a preferred form, the chord roll disk separator induces a primary bending mode to some of the disks being axially separated. In another aspect of the disclosure, a signal transducer is mounted integrally with the disk separator. With such mounting, primary, secondary, or higher order bending modes may be successfully employed. Full chordal and partial chordal axial disk separations are described. Arcuate and radially directed separation techniques may be employed. A unique axial stacking arrangement for compliant record disks is also described.

135 Claims, 29 Drawing Figures

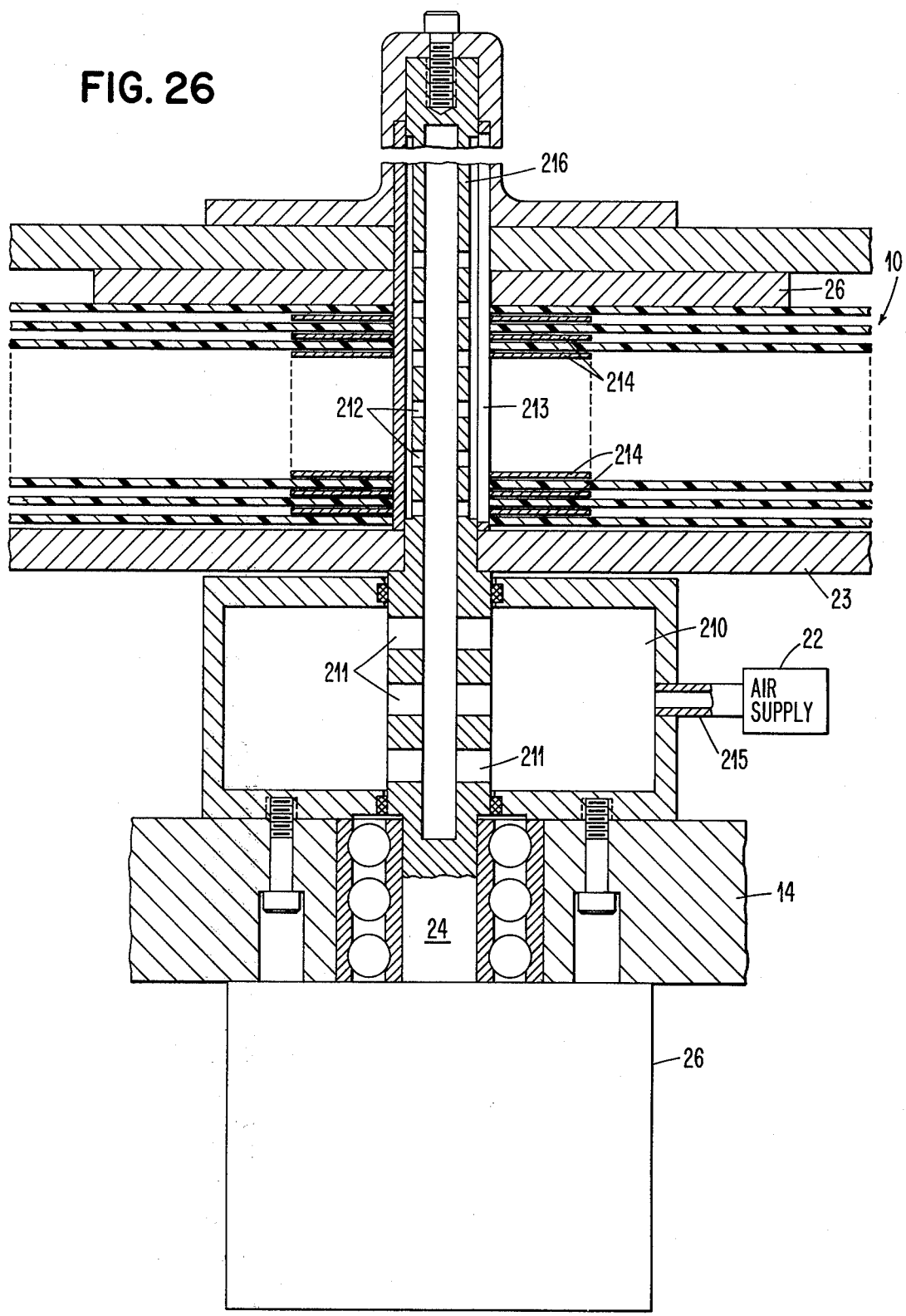

STACKED FLEXIBLE RECORD DISK STORAGE APPARATUS HAVING ENHANCED DISK SEPARATION

RELATED DOCUMENTS

Copending commonly assigned application Ser. No. 375,989, filed July 2, 1973, by Barbeau et al, entitled "Partitionable Disc Memory with Flexible Discs and Conformally Suspended Head", now U.S. Pat. No. 3,838,462.

Copending commonly assigned application Ser. No. 414,614, filed Nov. 7, 1973, by Penfold et al, entitled "Multiple Flexible Disk File," now U.S. Pat. No. 3,867,723, for showing an exemplary stack of circular compliant record disks.

Other References Related to this Application

Lynott et al IBM TECHNICAL DISCLOSURE BULLETIN, Volume 12, Number 1, June, 1969, Page 81, shows a compliant disk file of similar configuration to the present invention.

Pohm et al U.S. Pat. No. 3,703,713, issued Nov. 21, 1972, shows another flexible disk file signal storage apparatus.

Background of the Invention

The present invention relates to random access signal storage apparatus, particularly that apparatus employing rotatable record or storage disks which are selectively accessible by a movable transducer.

Rotating disk-type electronic memories have been used for the last several years. Most of these memories employ so-called rigid record disks wherein a plurality of transducers is simultaneously moved to corresponding radial positions on a like plurality of disk surfaces. While such apparatus provides rapid access to a relatively large amount of stored data signals, the volumetric efficiency of such apparatus can be enhanced. As data base requirements increase in size with available computing capacities, volumetric efficiency becomes more and more important. To attain such volumetric efficiency, recording densities, i.e., the number of signals stored per unit area, are being constantly increased. However, additional volumetric efficiency for large data bases can be attained by resorting to changing mechanical aspects of such rotating memory apparatus. To this end, flexible or compliant disks have been proposed as substitutes for the rigid disks to decrease the axial spacing between such disks. When the axial spacing is reduced below the thickness of a transducer and its corresponding mounting apparatus, the disks must be parted or separated to create an opening to permit such transducer to have access to a surface portion of a given record disk. To this end, the above-cited prior references and copending applications are directed.

An entirely new set of problems is presented by such compliant or flexible disk assemblies, particularly as to rapidly accessing a given record surface. It is desired that the total elapsed time of radial motion of a transducer to its desired track be minimized. Unfortunately, the faster a splitter arm or disk separator moves into such a disk pack or stack, the more energy is imparted to the disk pack. Such transfer of energy can result in fluttering or instability of the disks as they rotate past the splitter arm being inserted into the stack. Because of the compliancy or flexibility of the disks, the resultant fluttering can result in unsuccessful transducing operations for at least a period of time termed "settling time". Hence, it is highly desirable that flexible disk separation not only be accomplished quickly, but that the disturbance to the rotating disk assembly be minimized for achieving a stable recording platform (later defined) as quickly as possible.

The transfer of energy from a disk separator to a coaxial stack of flexible disks induces standing waves in the disks. Such standing waves represent stored energy. Such standing waves can be classified in accordance with the number of cycles in each such wave. Such classification is termed "bending modes". The lowest energy bending mode is a primary bending mode wherein the opening of the pack represents one-half the cycle with a partial closure of the pack diametrically opposite to such opening being the other half of the single cycle standing wave. In the referenced copending patent application to Barbeau et al, a secondary bending mode was induced by so-called "pack splitting" or "disk separation". This means there are two complete cycles of standing waves of axial disk separation-compression around the cicumference of the disk stack.

Such secondary bending mode transfers greater energy to the stack than that transferred if a primary bending mode were used. The effects of such transferred energy on the opening and closure of such packs will be later discussed in greater detail. Higher ordered bending modes may also be employed.

It is also desired that when one record disk is being accessed, the accessing splitter arm or disk separator be quickly removed and then inserted between a second pair of disks axially displaced from the first disks. Accordingly, closure time of the stack opening can become very important in that it can detract from the total access performance of the disk stack assembly. Generally, such closure time can be overlapped with axial transit time of the access arm to the second pair of disks. However, the closure time should never be greater than the minimum axial transit time of a disk separator and transducer.

Another factor important in utilization of compliant disk assemblies is the frictional relationship between the disk separator or splitter and the adjacent record disks. The relationship should be uniform, noncontacting and such that the disk may readily conform to the shape of the separator without causing wear on either the record surface or the separator. Further, the axial deflection of the record medium should be minimized for reducing fatigue. For example, circular record disks may be constructed using a polyester base substrate which is subject to fatigue and, hence, failure. By minimizing deflection, the transferred energy to the disk enhanced by the stresses induced into such disks is reduced, thereby reducing the fatigue factor and extending the life of the disk stack. Additionally, the forces required to separate the disks with a minimum opening are reduced, requiring a smaller actuator and hence reducing the cost of the signal storage apparatus.

At the initial entry into the disk pack assembly, the disk separator should have a minimum radial velocity. Such slow entry permits accurate location and provides insurance against unintended contact and resultant tearing, creasing or otherwise damaging record disks. Such a requirement is in direct conflict with minimum accessing; hence, it is desired to have a low initial entering velocity and a relatively high terminal entering velocity. The support of such a disk separator should be rigid to ensure accurate control of such separator for preventing unintended destroying contact with the record disk.

Characteristics of a rotating flexible disk pack vary with many parameters. For example, the thickness and properties of the circular record disk provide an important factor to be considered in designing such apparatus. If one mill polyester substrate having an oxide coating is used as a disk, such disk is subject to damage by unintended contact. Also, if the disk pack assembly stops rotation, such disks cannot support themselves and, hence, will droop. On the other hand, if a relatively thick circular record disk is employed, for example, one having a thickness of from 0.003 to 0.010 inch, resiliency and support can be provided within the disk structure. Other significant design parameters include disk rotational speed, inner diameter of the disks, outer disk diameter, and air flow in the stack.

Another factor is the axial spacing between adjacent disks. It can be a closed pack, i.e., no axial spacing, an axial spacing of less than 0.003 inch, or an axial spacing of, for example, 0.010 inch. All of these factors provide different design constraints in the construction and utilization of compliant disk signal storage apparatus.

Accordingly, it is desired to provide a diskseparating method and apparatus and disk stack configuration which provide versatility in design of such apparatus for enabling a wide set of design choices of record media, spacing, and other operational factors.

As used in this specification, the term "compliant" is intended to include all those disks subject to flexing, whether or not such disks have innate or inherent resiliency. Such disks are preferred to have a certain conformability for providing surface tracking to a disk separator.

Another difficulty in achieving a successful flexible disk file signal storage apparatus is the prevention or avoidance of wear by rubbing contact between the record members and the transducer or disk separator. Such wear, in addition to the previously discussed damaging contact, will cause magnetic coating on the record members to be removed and, finally, can cause destruction of the record members. The problem is particularly acute at the onset of disk separation; that is, as a disk separator is just beginning to enter a stack of such disks, the likelihood of unintended wear-causing contact is the greatest. Such wear at the circumference of the disk can wear the edges such that the disks are not countable, i.e., the edges are not clearly defined, making access to a stack of such disks difficult. Accordingly, it is highly desirable that a signal storage apparatus employing a plurality of flexible record members be accessed in such a manner that wear is entirely, or practically entirely, eliminated.

Summary of the Invention

It is an object of the present invention to provide an improved signal storage apparatus employing a plurality of coaxially stacked flexible disk record members which can be accessed with a minimum energy, reduced wear, and by a relatively simple apparatus.

In accordance with a first aspect of the present invention, access to a coaxial rotating stack of flexible disk record members is achieved by exciting a primary bending mode in the stack and accessing a record disk surface through a radial opening achieved via such primary bending mode.

In accordance with another aspect of the invention, a full chordal bending mode is achieved for providing partial axial separation of two axially adjacent disks to enable access to a surface of a record disk. In either of the above two-mentioned aspects, opening and closure times are optimized for the amount of energy expanded.

Another aspect of the invention provides a relatively smooth flow of the record disks over a disk separator blade or splitter arm creating the access opening. In another aspect of the invention, a disk separator blade, insertable into a signal storage apparatus employing circular rotating flexible disk record members, provides stabilizing surfaces for enabling a good recording platform for a transducer carried by such disk separator.

In accordance with another aspect of the invention, a disk separator is provided in which a transducer is mounted within the disk separator and extends axially outwardly through a stabilizing surface thereof for enabling a transducing relationship with a record disk moving relative to the stabilizing surface.

In yet another aspect of the invention, a disk separator for creating an access opening is pivotably mounted radially outward of a stack of rotating disks. For disk separation, the disk separator rotates such that the initial point of entry is downstream in the sence of rotation of the disk from the pivot axis of the disk separator. A transducer mounted on the disk separator is further downstream than the initial point of stack entry.

In accordance with the above, the radial velocity of the disk separator at the initial point of entry is minimal. Further, in regard to entry of a disk separator, an insertion wave generated by the disk separator is minimized by making the disk separator as small an angle as possible. In accordance with another aspect of the invention, the stabilizing surfaces of such a disk separator reduce perturbations in the record disks during insertion for yielding a greater control of such record disk perturbations to reduce settling time of the record disks. Accordingly, total access time to a record surface is reduced.

Vibration introduced into a disk stack and into a disk separator is minimized by using the primary bending mode for further reducing record surface access times.

A signal storage apparatus constructed in accordance with the present invention has an axial stack of a plurality of coaxial planar compliant circular record disks rotatable about a common axis coaxial with the center of such circular record disks. The stack rotates as a unit about the axis. Access to the record surface in the stack of disks is achieved by a positioning apparatus adjacent the stack and capable of axial motions along the stack and radial motions into the stack. Signal transducing means movable with the positioning apparatus provides transducing access to any given record surface. A disk separator on the positioning apparatus can consist of a wedge having an entering edge facing the stack with disk separating surfaces lying in a plane substantially parallel to said record disks. Such surfaces can diverge radially outward with respect to such disks at an angle preferably not greater than approximately 17°, no limitation thereto intended. It is presently preferred that such angle be substantially less than 17°. One of the surface portions of the disk separator is preferably a stabilizing surface through which a transducer mounted in a disk separator axially extends for transducing actions with a disk record surface. The other surface portion of the disk separator is considered a stack opening surface and preferably has an axially outwardly facing concave configuration (no limitation thereto intended). The transverse or chordal extent of the disk separator may either be greater than the chordal length of the disk portions or segments being axially separated, or less than such chordal length. It is preferred that the disk separator be pivotably mounted for pivoting actions including the radial component into the stack of disks such that the pivot axis of the disk separator is upstream when measured with the sense of rotation of the disk from the initial entry point, with the initial entry point being further upstream from the transducer mounted in the separator.

A presently preferred radial angle of disk separation is approximately 4°; for a disk separator mounting a signal transducer, a presently preferred angle is about 8°.

The above-described apparatus may be further modified by the introduction of fluid communication means in the disk separator for providing fluid into the access opening of the stack of disks. In a preferred configuration, fluid pressure by air is greatest at the entering edge portion with a lower pressure on the surface portions extending radially outwardly of the entering portion. This is important to reduce the amount of air flow into the stack such that instabilities are not introduced into the rotation of the disks while maintaining desired separation of the record disk from the disk separator.

At the initial disk stack entry point of the disk separator, the area of higher air or fluid pressure is increased radially outward for providing enhanced initial disk separation operation. Further enhanced operation is provided by air or fluid communication ports for blowing a jet of air radially inwardly at the initial point of entry. Such radial inward air flow is preferably pulsed; that is, at the onset of disk separator entry into the disk pack, a pulse of air moves radially inwardly for momentarily axially separating a small outer circumferential segment of the two disks to be partially axially separated. The disk separator then radially enters such momentary opening to establish the access opening, as described above. This aspect of the invention is important for preventing wear on the circumferential outer edge portion of the rotating record members.

In another aspect of the present invention, settling time or closure time of an access opening is minimized by a smooth withdrawal of a wedge-shaped chord roll-type disk separator which permits the record members adjacent the access opening to smoothly follow the surface of the disk separator to a closure point as the wedge is withdrawn.

The foregoing and other objects, features, and advantages of the invention will become apparent from the following more particular description of a preferred embodiment of the invention, as illustrated in the accompanying drawing.

The Drawing

FIG. 25 illustrates certain mounting aspects of the head.

FIG. 26 diagrammatically illustrates a preferred spindle or arbor mount for an axial stack of axially spaced-apart record disks.

GENERAL DESCRIPTION

Figure 1:
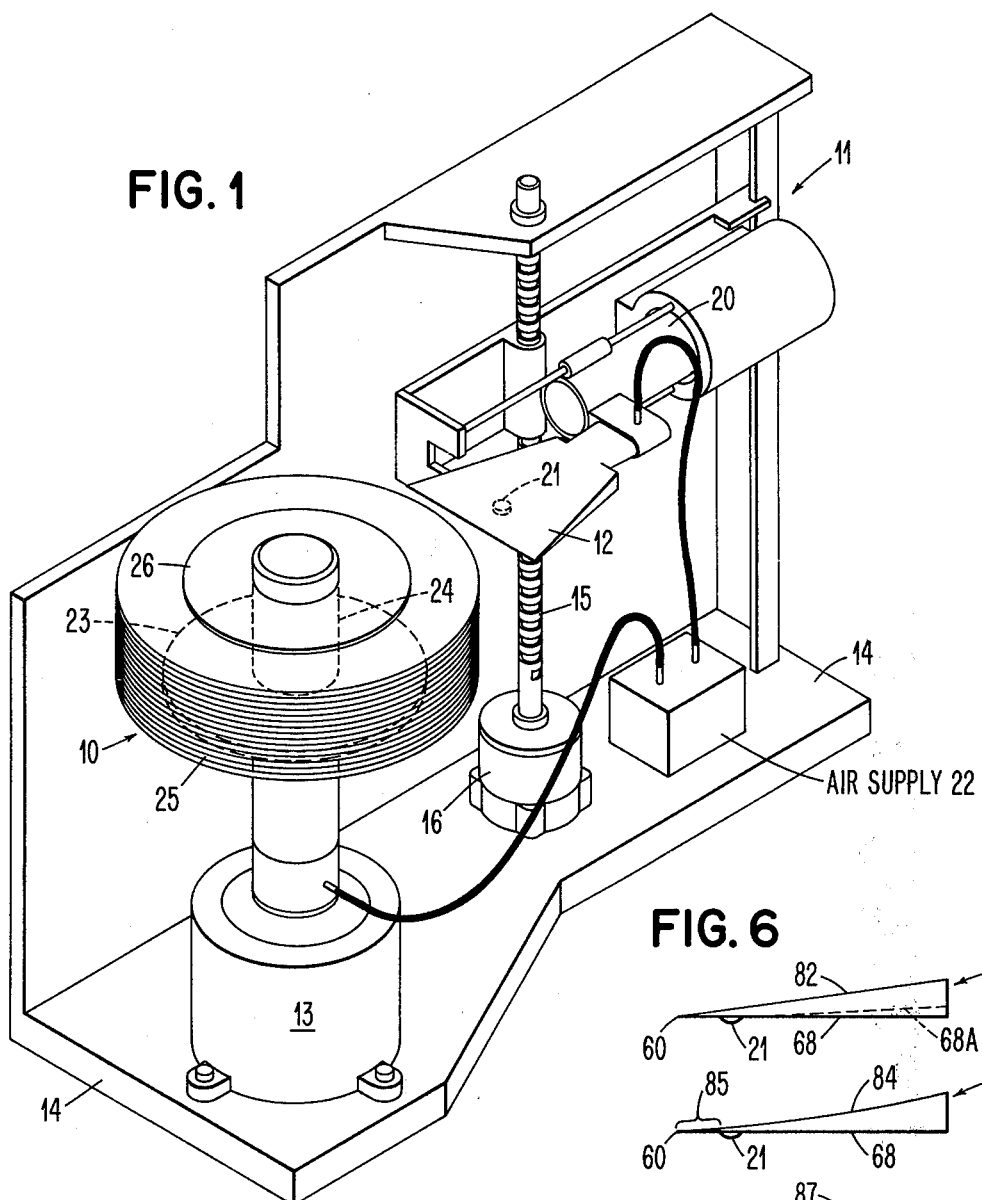
FIG. 1 is a simplified diagrammatic front elevational view of an apparatus employing the teachings of the present invention.

Referring now more particularly to FIG. 1, a stack of later-described rotating record member disks 10 is selectively accessed by apparatus 11 moving disk separator 12 radially into the stack of disks 10 between a selected two of the disks. The stack of disks 10 may be constructed in accordance with the teachings of Penfold et al in their application, supra and as shown in FIG. 26. Stack of disks 10 is suitably rotated by motor 13 mounted on a frame 14. Accessing apparatus 11 is precisely mounted on frame 14 to enable access between two adjacent disks which are separated, for example, by no more than 0.010 inch. To this end, the axial movement of access apparatus 11 is by a lead screw 15 powered by motor 16 on frame 14. The pitch of lead screw 15 is such that each one-quarter rotation moves apparatus 11 from the center between two adjacent disks to the center between the two next adjacent disks such that the axial positioning of disk separator 12 is accomplished by counting quarter-rotations of lead screw 15 from a precise home position.

The FIG. 1 illustrated apparatus first moves access apparatus 11 to the desired axial position; then, disk separator 12 is moved by actuator 20 radially inward to achieve the later described disk partial axial separation for access to a record surface by integrally mounted transducer 21, as will become apparent.

Air supply 22 supplies air to the stack of disks 10, as described by Penfold et al, supra, as well as to fluid communication means (later described) within disk separator 12 for providing additional fluid flow during disk separation by the disk separator in one version of the present invention.

A stack of disks 10, cnstructed in accordance with Penfold et al and as mentioned hereinafter, includes a reference plate 23 secured on motor shaft 24 for rotation with the stack of disks 10. Reference plate 23 is adjustably mounted on shaft 24 such that apparatus 11 has a home position in a predetermined precise axial relationship to reference plate 23 such that the same record disk is always accessed from such home position. Large diameter disks, colored disks or other specially identifiable disks may be used for home position. Such record disk is referred to as the home disk and preferably contains control information related to stored data signals in other record disks. Such home disk may be at 25 in the stack of disks 10, it being desirable that all record disks be axially displaced from the reference plate 23, as well as the axial outer end plate 26 for reasons that will become apparent.

Figure 14:
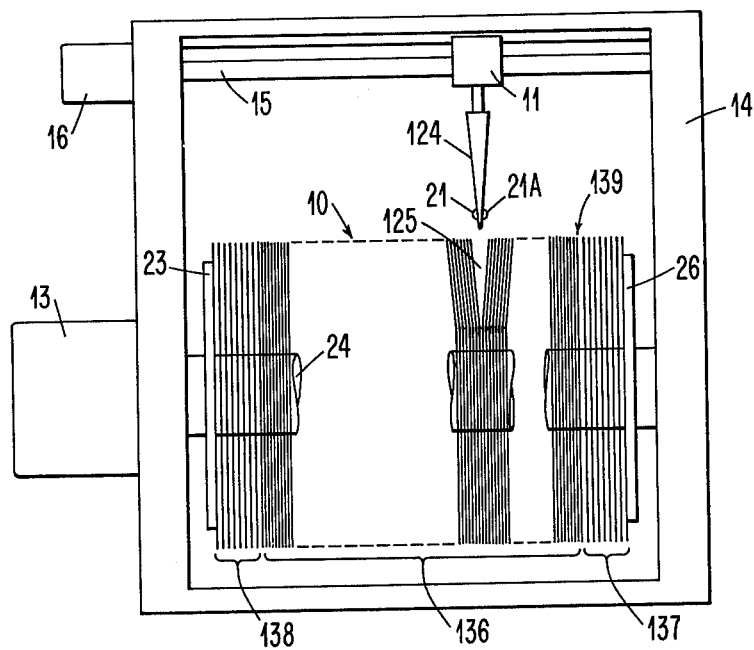
FIG. 14 is a diagrammatic showing of a stack of record disks constructed in accordance with one aspect of the invention for facilitating symmetrical disk separation.

The illustrated vertical orientation is satisfactory for flexible record disks up to about 12 inches in diameter. Flexible record disks in this particular instance means those made on 0.001 inch Mylar base. At diameters of 12 inches and greater, the apparatus should be oriented horizontally as shown in FIG. 14.

Figure 2:
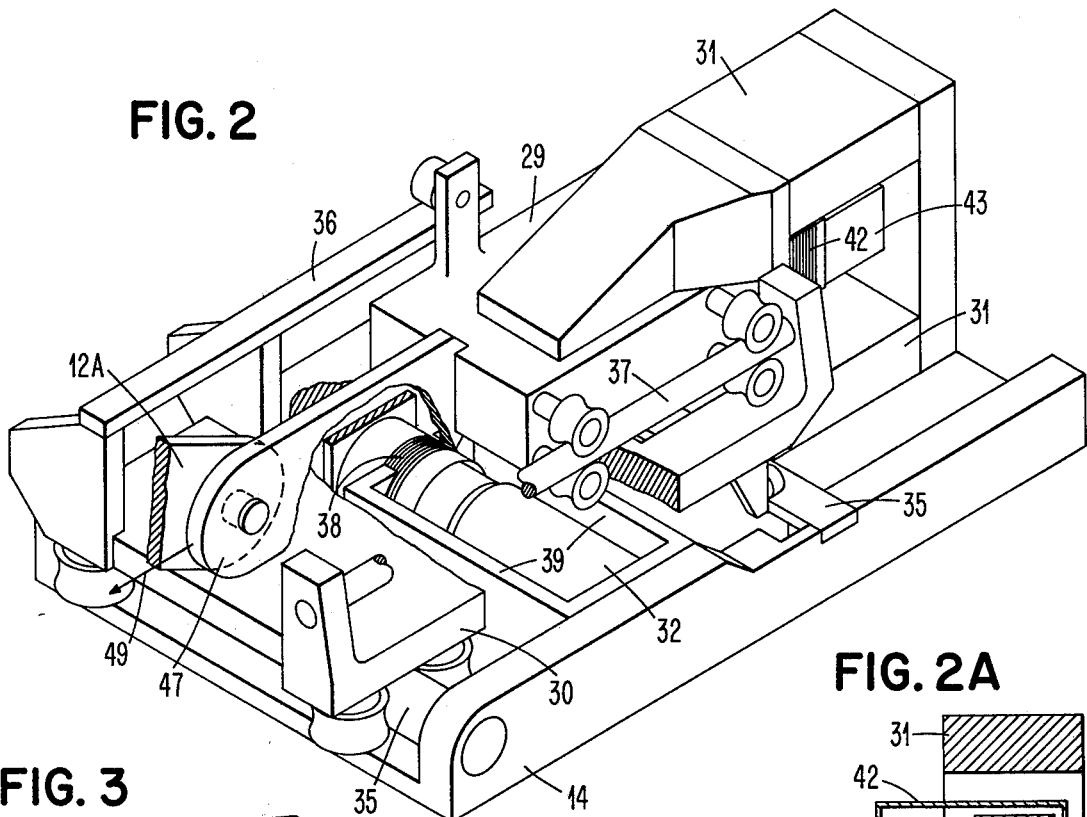
FIG. 2 is a diagrammatic isometric view of a positioning apparatus usable to position a disk separator axially and adially of a stack of rotating disks. All or part of the FIG. 2 illustrated apparatus may be employed with the FIG. 1 illustrated apparatus.

Referring next to FIG. 2, an orthogonal voice coil type actuator, usable with the FIG. 1 illustrated apparatus, is described. Transversely movable cariages 29 and 30 are respectively actuated by a pair of orthogonally acting permanent magnets 31 and 32. Both the magnets are stationarily mounted on frame 14. With this arrangement, the weight of axial carriage 30, and radial carriage 29, is reduced.

Axial carriage 30 rides on a pair of parallel guide rods 35, while radial carriage 29 rides on a pair of similar, but transversely disposed, guide rods 36 and 37. Axial acting magnet 32 on frame 14 coacts with voice coil 38 to move carriage 30 in accordance with known voice coil positioning techniques. If the spacing between adjacent record member disks in stack 10 is sufficiently large, a feed-forward servomechanism may be provided in the same manner that lead screw 15 provided feed forward axial positioning of disk separator 12. Since the axial position of carriage 30 can be controlled more precisely than the axial positioning of lead screw 15, closer axial spacings are achievable by using the FIG. 2 illustrated apparatus over a lead screw axial positioner. Known voice coil control circuits and positioning sensing mechanisms are employable with the FIG. 2 illustrated apparatus for completing the axial positioning step of the FIG. 1 illustrated apparatus. The axial magnet structure is completed by the U-shaped pole piece 39.

Figure 2A:
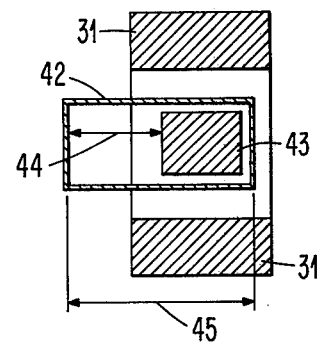
FIG. 2A is a diagrammatic showing of selected axial dimensions of the FIG. 2 illustrated apparatus.

Radial carriage 29 is radially moved by voice coil 42. COil 42 continuously resides within the magnetic flux field of radial acting permanent magnet 31 and is controlled in the same manner as voice coil 38. Flux return path 43, for magnet 31, has an extent less than the coil 42 axial extent as best seen in FIG. 2A. Axial extent of magnet 31 and flux return path 43 is shown as residing entirely within the confines of voice coil 42. COil 42 has an axial extent greater than the axial extent of flux path 43 by a distance 44 permitting an axial stroke of length 45 by carriage 30.

Position sensing means (not shown) for the radial motions of carriage 29 are constructed using known techniques, such as known linear tachometers. Control circuits for energizing coil 42 can use known techniques, such as the actuating circuits used in the so-called head actuators on the present-day disk file apparatus employing rigid substrate circular record members.

Figure 3:
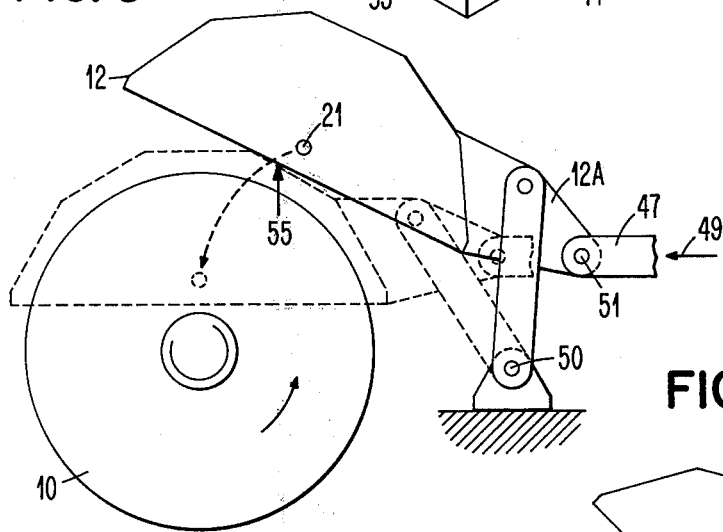
FIG. 3 is a simplified diagrammatic view of a preferred configuration for mounting a disk separator having an integrally mounted transducer.
Figure 5:
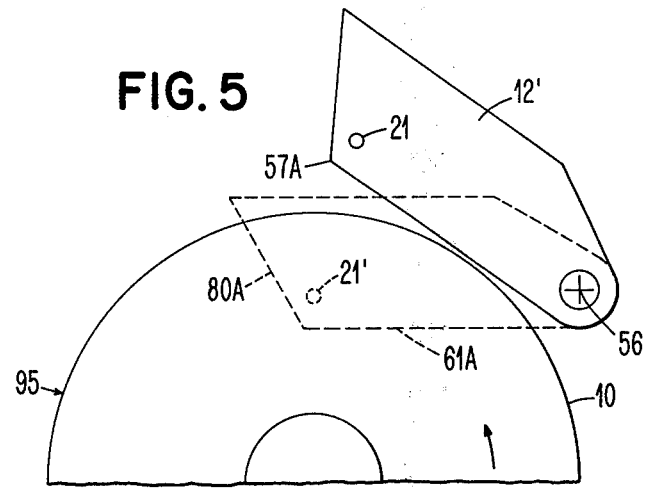
FIG. 5 is a diagrammatic view similar to that of FIG. 4 but showing a disk separator having a chordal length less than the chordal length of the disk segment being axially deflected.

Carriage 29 has a forwardly extending arm 47 which pivotably connects to separator arm 12A (FIG. 3 or 3B) or 12' of FIG. 5. In a preferred form of the invention, disk separator 12 is pivotably moved into stack 10 for providing an optimum disk separating operation as best described by referring to FIGS. 3 et seq. FIG. 3 is an end diagrammatic view of a stack of disks 10 to be separated by urging of arm 47 of the FIG. 2 illustrated apparatus. As the carriage moves radially toward the stack of disks 10, as indicated by arrow 49, disk separator 12 pivots downwardly into disk separating engagement with stack 10, yielding a compound action of pivoting about axes 50 and 51. As disk separator 12 pivots toward stack 10, it has an initial entry point at 55 exhibiting a minimal radial entry velocity. This minimal radial velocity is important to prevent unintended contact with the outer circumferential edge portions of the record disk being separated. Accordingly, the force supplied via disk separator 12 to the record disk being separated should be minimal at this initial entry point. As will be later described, the force applied to the disk for separation can be advantageously augmented by a pulse of air emitted from an initial entry portion of disk separator 12. Once disk separator 12 has created an access opening in stack 10, the conformance of the adjacent disks to the separating surface portions of separator 12 eliminates the necessity for an air jet at 55. In fact, it is desirable to minimize the air flow in an air-emitting disk separator to closely control the volume of air supplied by the separator into the disk 10 stack. Too much air flow can cause instabilities of the rotating record disks and thereby effectively destroy any recording platform for transducer 21.

Figure 3A:
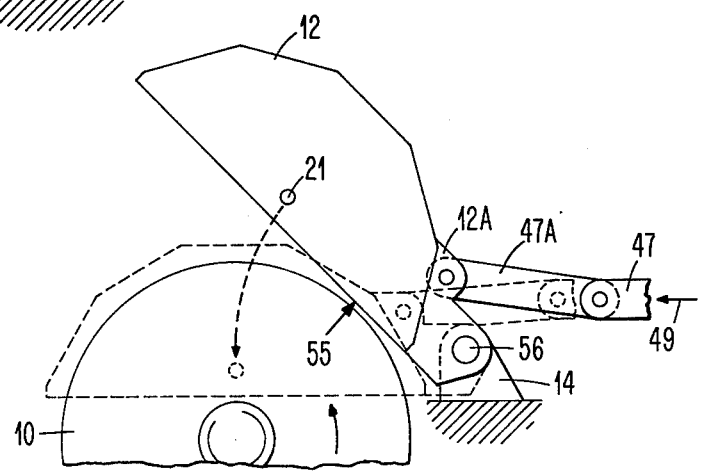
FIG. 3A is a diagrammatic showing of a pivotally mounted disk separator.

A preferred pivotally mounted disk separator 12 is shown in FIG. 3A wherein actuator arm 47 is pivotably secured to arm 12A by pivot link 47A and connected to arm 12A intermediate a fixed pivot point at 56 on frame 14 to pivot arm 12' into and out of a stack of disks 10. The explanation for FIG. 3 applies substantially equally to the illustrated FIG. 3A configuration. A combined rotary-axial movable actuator may replace the FIG. 3A illustrated configuration.

Axial Disk Separation

Figure 6:
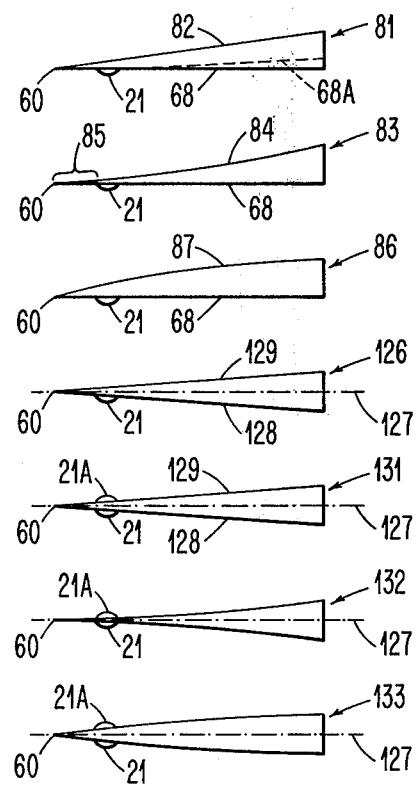
FIG. 6 is a set of diagrammatic end views of exemplary disk separators usable with the illustrated apparatus as taken in the direction of the arrows along line 6—6 in FIG. 4.
Figure 4:
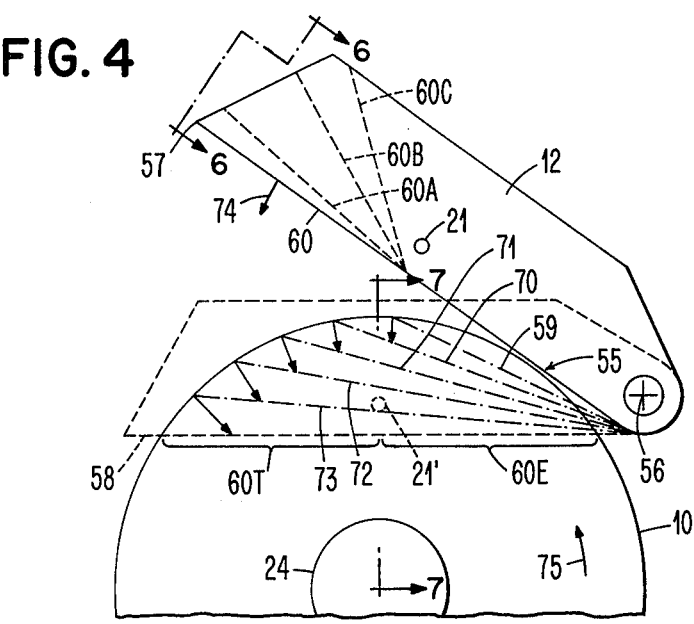
FIG. 4 is a diagrammatic showing of disk separation employing a pivotable chord roll disk separator having a chordal extent greater than any chord of the disk segment subjected to axial deflection.
Figure 7:
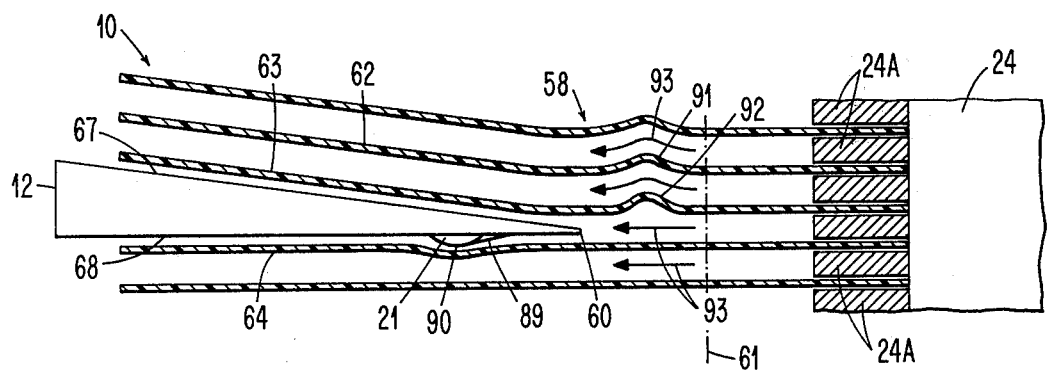
FIG. 7 is a diagrammatic showing of disk separating action, particularly with respect to the transducer record surface relationship and of the so-called bow wave induced by disk separating action.

The interaction between disk separator 12 and the stack of disks 10, particularly for the FIG. 3A configuration, is better understood by referring to FIGS. 4, 5, 6, and 7. The pivot actuation of disk separator 12 is not shown in these figures for simplicity, it being understood it can be directed to the disk separator 12 itself or to a separate arm secured thereto at the axis of pivoting 56. Referring to FIG. 4, a full chord roll disk separator 12 has a chordal length greater than any chordal length of the circle segment of a disk axially deflected by disk separator 12. By this is meant that the length from the hub rotatable about pivot axis 56 to a separator outer extremity at 57 is greater than any chordal length of disk 10 at maximum insertion, as indicated by the dashed line 58. Disk separator 12 is illustrated in a position termed the onset of disk separation; that is, the initial entry point 55 of disk separator 12 is about to enter between two disks in the disk stack. After initial entry at 55, a transition line of the primary bending mode is represented by dashed line 59; that is, this is the chordal line along each disk 10 being axially deflected defining where a disk is bent from a line perpendicular to the axis of rotation of the disk to an angled line determined by the shape of disk separator 12 as best seen in FIG. 7.

Figure 8:
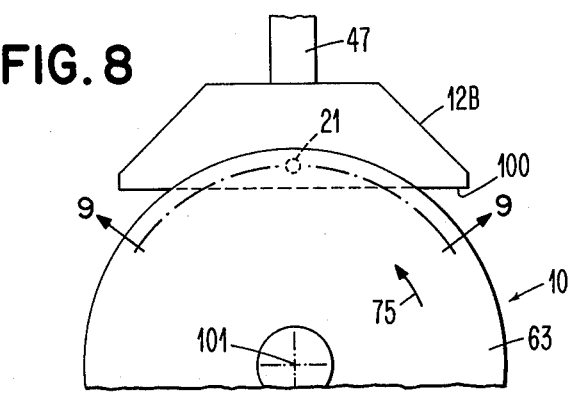
FIG. 8 is a diagrammatic showing similar to that of FIGS. 4 and 5 but for a radially moved chord roll disk separator.

FIG. 7 is a diagrammatic sectional view taken along line 7—7 in the direction of the arrows of FIG. 4 to illustrate the relationship of the disks separated by disk separator 12 when it is in an accessing position of the stack of disks 10. The maximum transition line 58 is a circular line as seen in FIG. 8. As viewed in FIG. 7, the portion of disks 62 and 63 to the right of line 61 is substantially parallel to the remaining disks in the stack; while the portion to the left of maximum chordal line 58, the innermost transition line, is preferably parallel to the disk separating surface portion 67 of separator 12 and is disposed at an angle with respect to the lower disk 64, determined by the wedge shape of separator 12. In a preferred form of the invention, this angle is not greater than 17°, as measured from reference surface 68 of separator 12 and preferably from about 4°. When head or transducer 21 is mounted in disk separator 12, it extends axially outward of reference surface 68 as shown in FIG. 7. In the latter instance, the presently preferred wedge or opening angle is about 6°, no limitation is intended to any specific angle. The forces impacted to the record disks are proportional to the angles in disk separator 12. For minimum energy expended for pack insertion and minimum fatigue in the record disks, the disk separator 12 angles are minimized.

Returning now to FIG. 4, the entrance of separator 12 into disk 10 stack from the entry point at 55 proceeds by making a succession of chordal transition lines 59, 70, 71, 72, 73, and finally 58, the deepest radial penetration. Transducer 21 is shown as dot 21' at the deepest penetration.

When separator 12 is opening the stack of disks 10, a so-called primary bending mode is induced in stack 10. The primary bending mode is maintained while separator 12 keeps the stack split to access a given track on a record disk 10. For accessing various tracks, separator 12 moves radially to different positions; for example, deepest penetration is indicated by transition line 58 accesses of the innermost track by the head at 21'. To access radially outward tracks, separator 12 is accurately pivoted in the direction opposite to arrow 74 by using known voice coil techniques, for example. Track following and locating procedures used with this apparatus employing fixed record disks may be applied equally to the track location on flexible record members as employed by the present invention.

As disk separator 12 pivots radially inwardly to various accessing positions, as indicated by the successive chordal lines 70–73, the velocity of disk stack entry increases as indicated by the arrows from the circumference of the stack 10 to the various chordal lines. It is remembered that the velocity of entry at the initial entry point 55 is a minimum. As disk separator 12 enters further into the stack, the disks conform to the separator surfaces to permit a higher edge 60 entry velocity. Examination of FIG. 4 shows that the velocity of entry of the radial outward portion of member 12, i.e., radially from pivot 56, increases in the direction of the rotation of stack 10, as indicated by arrow 75. Entry velocity of that portion of the disk separator intermediate the initial entry point 55 and pivot axis 56 is axially slower than the initial entry speed. The above-described advantageous arrangement is afforded by making the initial entry point 55 downstream from pivot axis 56 in the sense of rotation of stack 10 as indicated by arrow 75. Similarly, the entry velocity of transducer or head 21 should be relatively high because of the axial protrusion thereof. Accordingly, head 21 is preferably located substantially downstream from the initial entry point 55. For the gap in a transducer 21 to strike a maximum energy relationship with tracks on a record disk, it is preferred that head 21 be positioned on separator 12 to lie on a radius of disk stack 10 perpendicular to the transition line 58 representing the maximum entry of separator 12. Other gap orientations can be selected while still practicing the present invention. The head gap orientation can be servoed to always be along a radius.

As seen in FIG. 4, edge 60 has an entry edge portion generally denoted by numeral 60E, and a trailing edge portion generally denoted by numeral 60T. When the record disks rotate about hub 24 in the direction of arrow 75, the disk surfaces enter onto disk separator 12 at 60E and leave at area 60T. While the first embodiment aligned portions 60E and 60T in a straight line, certain advantages accrue from truncating disk separator 12 along trailing edge portion 60T. In an early truncation, trailing edge portion 60T was truncated along dashed line 60A, about 10° from chordal line 60. Later, greater truncations at 60B and 60C were tested. Depending upon disk pack and separator parameters, such truncation does not detract from the chord roll or wedge separating action while enhancing radial outward air flow. Without truncation, disk separator 12 can restrict such air flow such that desired spacing between a record disk and disk separator 12 is not maintained. In such an instance, undesired contact between a record disk and the disk separator can occur, resulting in a damaged disk. Truncating trailing edge portion 60T by rotating it outward from chordal line 60 enhances radial outward air flow to maintain desired disk separation. The truncated edge is suitably rounded to avoid sharp edges.

Figure 20:
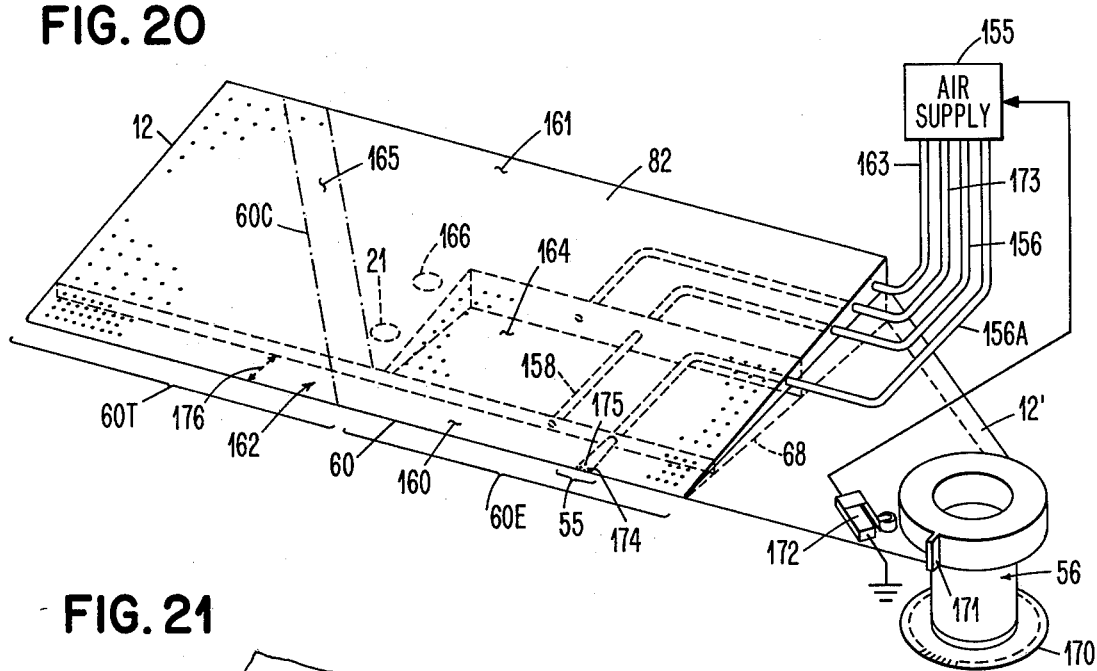
FIG. 20 is a diagrammatic perspective view showing a chord roll disk separator employing preferred fluid communication means for enhancing disk separating action.

An alternative to truncation is to provide hydrostatic disk separation as described with respect to FIG. 20. However, in such an instance, introduction of excessive air into the disk pack can cause the disks to wobble or flutter—such destroys any transducing relationships of head 21 to a record disk that are necessary for successful magnetic recording and reproducing.

Disk Separator Cross-Sectional Shapes

It has been mentioned that disk separator 12 is wedge shaped, such as shown in FIG. 7. This wedge shape permits a variety of disk controlling surface configurations, while still employing the present invention. As shown in FIG. 6, there is a multitude of cross-sectional shapes which can be selected in the design of a particular signal storage apparatus. All of the views of FIG. 6 are taken in the direction of the arrows along line 6—6 of FIG. 4. As viewed in FIG. 4, the cross-sectional shapes shown in FIG. 6 preferably follow the entire length 60 of disk separator 12. While compound surfaces may be employed, such are not necessary. The truncated trailing edge 80 has a cross-sectional shape similar to that shown in FIG. 6 for the cross-sectional view. An early cross-section employed in the present invention, as shown in FIG. 6, is at 81 having a planar disk stabilizing surface 68 through which head 21 axially outwardly extends. The leading or entering edge 60, in all of the cross-sections, preferably has a small radius of curvature, such as 0.010 inch. This has certain advantages as being sufficiently sharp to provide good initial separating action, yet the radius of curvature tending not to cut relatively thin record members, such as those constructed of a magnetic coating on a 0.5 mil Mylar substrate. The disk-separating surface of configuration 81 is planar and disposed at an angle with respect to reference surface 68 of preferably not greater than 17° nor less than 4°. The angle should be as small as possible; however, for purposes of mounting head 21 as close to entry edge 60 as possible, the present optimum compromise is about a 6° angle between surfaces 68 and 82.

Lower surface 68 of cross-section 81, 83, and 86 may be cut back or otherwise contoured as indicated by dashed line 68A. This alternate cross-section tends to reduce potential contact (and damage) with recording surfaces in transducing relationship to head 21.

A second and more preferred configuration of the disk separator cross-section is shown at 83 wherein reference surface 68 is planar with head 21 extending axially outwardly. The disk separating surface 84 is concave as looking axially outwardly from the disk separator. Such concave disk-separating surface provides an advantageous harmonic air-foil relationship between the disks being separated and the disk separator. Initially, the angle of separation is relatively small and increases in a smooth diverging manner. Such configuration allows a relatively sharp, low-resistance entry, such as in the entry edge portion 85 intermediate leading edge 60 and head 21.

In another embodiment shown at 86, the disk separating surface is convex, as at 87. In this configuration, head 21 can be placed radially closer to entry edge 60 than in the other embodiments. This configuration may find usage with relatively thick record disks.

As will be later described, some of the configurations of disk separators can be symmetrical; that is, the stabilizing surface can distend at an angle with respect to the plane of the undisturbed record disk. Since this is a separate embodiment, the configurations in FIG. 6 relating to such symmetrical disk separation are described later with respect to FIGS. 14 and 15.

Depending upon the protrusion of head 21 through a surface 68, flexibility and thickness of the record disks, and shape of initial disk pack opening, head 21 has a finite probability of catching on the edge of the disk to be recorded upon as head 21 enters the disk pack volume. Two things can be done to avoid this problem. The first and preferred solution is to provide radial ramp 89 shown in FIG. 7. Ramp 89 has a width at least that of head 21, plus a slope with respect to surface 68 dependent on pack entry speed, record disk parameters and the disk pack opening at time of head 21 entry. A second solution is to axially deflect disk 64 away from surface 68 at time of head 21 entry. Such small axial deflection can be achieved by a pulsed jet of air as described with respect to FIGS. 20 and 21, item 55, but located at ramp 89 (FIG. 7) position rather than in the leading edge position as shown in FIG. 20.

Ramp 89 is preferred because it also provides a second function of damping bow waves 91, 92. Such damping tends to stabilize head 21 to record surface relationship resulting in improved signal recording and readback. It is also preferred that disk separator 12 be electrically conductive for avoiding electrostatic buildup.

Disk Stabilization During Partial Axial Separation

In the configurations 81, 83, and 86, stabilizing surface 68 is a planar configuration parallel to the disk to be stabilized. It is believed these configurations provide a good recording platform for any head extending axially through such reference or stabilizing surface. Referring to FIG. 7, lower disk 64 is stabilized by the relative motion with respect to reference to stabilizing surface 68 of separator 12. Depending head 21 dimples into the disk 64 to provide a positive pressure between record disk 64 and a transducing gap for providing a good record-to-gap interface. With disk 64 stabilized by surface 68 and head 21 protruding into disk 64 yields a good stable recording platform, a predictable tranducing relationship is established.

Examination of FIG. 7 also shows that the access opening provided by separator 12 introduces a so-called bow wave in the upper disk 62 and 63, as at 91 and 92, respectively. The action of this bow wave, which has always been observed as being present in accessing using the principles of the present invention, is a perturbation tending toward instabilities in the rotating record disks. By selection of the configurations illustrated in this application, the size of the bow waves 91 and 92 can be controlled such that the perturbations do not adversely effect the medium-to-gap interface between record disk 64 and transducing gap 90, for instance. In this manner, the recording platform is maintained.

If the speed of entry by disk separator 12 becomes excessive with respect to the air foil and stabilizing action of surfaces 68 and 67, bow waves 91 and 92 can become excessively large such that upper disk 63 can get a fold and actually become interleaved between surface 68 and lower disk 64. In such a situation, upper disk 63 is damaged. For this reason, it is necessary that when selecting an angle for disk separator 12, the access times must be precisely considered. For example, the greater the angle is distended between surfaces 67 and 68, the slower the access time, i.e., the greater the possibility of a destructing bow wave being generated.

The bow wave perturbations extend to several disks immediately adjacent the disks 62 and 63. This is particularly true of the disks above the disks 62 and 63. Additionally, the bow waves, if sufficiently large, can cause perturbations in the lower disk 64. Such perturbations then are transmitted radially outwardly of disk 64 to be adjacent head 21 and thereby interfere with the stability of disk 64 with respect to transducing gap 90. This can have devastating effects on the success of recording operations, particularly at high densities in narrow record tracks. By selecting the shape of the disk separator 12 and displacing head 21 sufficiently back from entering edge 60 and controlling the access speeds, a satisfactory medium-to-gap interface or relationship is established. An added feature for stabilizing disks in stack 10 is the use of radially outward air flow as indicated by the arrows 93 and as taught by Penfold et al, supra.

Figure 9:
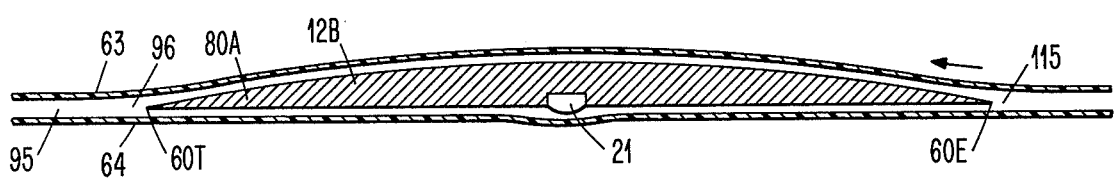
FIG. 9 is a simplified diagrammatic sectional view of a chord roll arm having an integrally mounted head showing the relationship of a record medium moving over the disk separator and the transducing relationship of the integrally mounted head with the record surface.

Returning now to FIGS. 4 and 5, FIG. 5 shows a truncated disk separator 12' having a length from its pivot axis 56 to its outer end 57A which is less than the maximum chordal length of the disk in stack 10 at maximum penetration as at 61A. In this instance, separation of the disk conforms to the surface configuration of separator 12' up to and including the trailing edge 80A. From thence until closure of the pack during rotation, as at 95, an open space between the two disks being separated occurs. This is best seen in FIG. 9 wherein an upper disk 63 and a lower disk 64 are passing over disk separator 12' having a truncation or trailing edge at 80A, leaving a space 96 not controlled by the surfaces of disk separator 12'. Here a designer has a choice between the FIG. 4 and FIG. 5 configurations. In the FIG. 4 configuration, separator 12 can substantially completely fill the access opening generated by penetration of the separator into the disk stack. In this situation, the actual deflection of the disk is precisely in accordance with the relationship of the disk to the separator; i.e., there is an air-foil or flying relationship such that the disks are amply stabilized and controlled during disk separation.

One important aspect of operating memory apparatus in accordance with the invention is the total access times. Each access time has several portions, for example, the time it takes separator 12 to reach the desired separation penetration of the stack, the time for the disk to settle down after such separation, plus the removal of the disks of disk separator 12, the subsequent axial travel to the next set of disks to be separated, plus the closure time of the stack; that is, the time it takes disks 63 and 64 to again become truly substantially parallel for enabling a subsequent disk-separation operation. It is believed that with the FIG. 4 illustrated apparatus, closure time is controllable because the disks that were separated tend to follow the configuration of the wedge-shaped disk separator 12 during its removal, thereby minimizing the energy transferred from the separator to the pack for thereby minimizing fluttering and other instabilities of this disk which can be caused by an improper disk-separator withdrawal and resultant instable pack closure. Certain advantages from utilizing the primary bending mode in this regard will be set forth later in that the energy transferred from the disk separator to the pack is minimal resulting in any instabilities caused by the energy which is inherent to the disk pack rotation. On the other hand, the FIG. 5 configuration reduces the moment of inertia in or the mass of the disk separator 12' by a substantial amount. This means that the energy required to pivot or otherwise move disk separator 12' into disk stack 10 is reduced. Depending on the construction and materials used in making such disk separators, the advantage accrued by the FIG. 5 configuration can offset some of its disadvantages. Again, in FIG. 5, the preferred location of head 21 is on a line perpendicular to the chordal transition line 61A and through the center of rotation of the disk stack 10, no limitation thereto intended. The effect on closure of the FIG. 5 illustrated apparatus is that the trailing edge portion, i.e., the opening 96 (FIG. 9), is not completely controlled. This lack of control over the trailing edge portion of the access opening will not necessarily substantially increase the closure time. That is, rotating stack 10 always seeks its lowest energy position—that of all of the disks being parallel and perpendicular to the axis of rotation of the disk stack. If excess energy is provided into the stack, fluttering may occur. However, this fluttering of the stack is minimized by providing a suitable radial outward air flow as indicated by arrows 93 (FIG. 7). With all of these factors taken together, either the FIG. 4 or FIG. 5 versions of the disk separators 12 and 12' can be successfully employed in practicing the present invention.

As mentioned earlier, disk separator 12 can be either pivoted into the stack or moved on a radius into the stack. Referring to FIG. 8, a radial moving disk separator 12B is diagrammatically shown. It is rigidly mounted on the outer end of actuator arm 47, as illustrated in FIG. 2. Head 21 can be located symmetrically in the disk separator and extends downwardly into transducing engagement with lower disk 64, as best seen in FIG. 9. Of course, when multiple heads are employed, such symmetrical location cannot be achieved for all heads. In a two gap head having a read gap following a write gap, the two gaps are on a common arcuate path.

FIG. 9 is an arcuate section taken along line 9—9 of FIG. 8. Entering edge 100 is disposed on a chord of disk stack 10 with head 21 located on a line transverse to entering edge 100 and which also intersects the axis of rotation 101 of disk stack 10. Head 21 is disposed fairly close to entering edge 100 resulting in an access opening and recording platform substantially as shown in FIG. 7. A disadvantage of the FIG. 8 illustrated configuration is that the initial entry speed advantage discussed with respect to FIGS. 4 and 5 is lost. As shown in FIG. 8, head 21 is scanning an outer track of disk 64 (not seen) with only a partial access opening. Note, however, that even with the partial access opening, upper disk 63 follows a simple harmonic type path over disk separator 12B in the same manner that disk 63 tracks a smooth harmonic type path over disk separator 12. The particle path over disk separator 12 is preferably an eighth order polynomial. Such a travel path minimizes particle axial accelerations while keeping axial acceleration somewhat constant. Head 21 dimples into lower disk 64 for providing positive pressure for a good transducing relationship.

Figure 12:
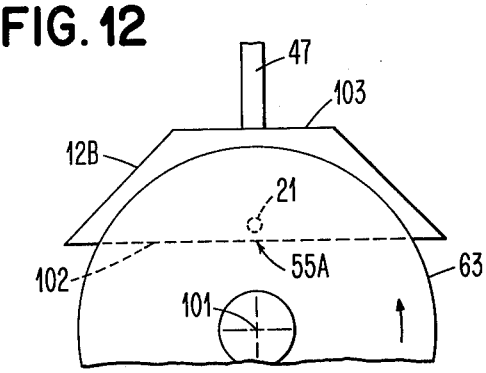
FIGS. 12 and 13 are diagrammatic showings of radial accessing of a stack of disks using a chord roll disk separator.

Full penetration into the stack by using a radially movable disk separator 12B is shown in FIG. 12 wherein dashed line 102 represents the inwardmost transition line of a primary bending mode. Head 21 is just radially outward of line 102 on a radius extending perpendicular to chord line 102. The outer circumference of disk 63 does not extend over the radial outward edge 103 of disk separator 12B.

Figure 13:
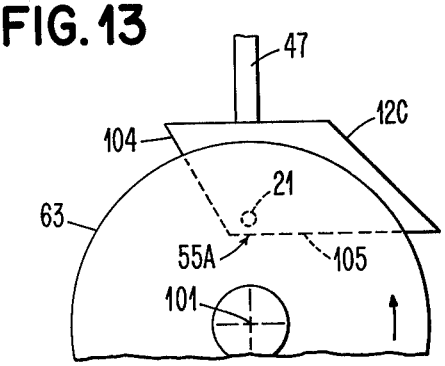

Referring to FIG. 13, a truncated radial disk separator 12C may be used in the same manner as described for disk separator 12B. In this instance, the truncated separator is mounted on actuator arm 47, as described for disk separator 12B. Trailing edge 104, which truncates the chordal extent of disk separator 12C, yields an open space in the access opening similar to opening 96 of FIG. 9. The same advantages and disadvantages accrue between the FIG. 13 and FIG. 12 illustrated embodiments, as between the FIGS. 5 and 4 illustrated embodiment. In FIG. 13, the innermost transition line of primary bending mode is at 105 which is at a chord perpendicular to a center line dissecting head 21. The cross-sections, as illustrated in FIG. 6, are applicable to the embodiments shown in FIGS. 8–13 in the same manner as they can be applied to the pivoted disk separator, as shown in FIGS. 1–7.

An important aspect of the chordal disk separator, which tends to roll a segment of the upper disks 62 and 63, is a minimum fatigue factor for such partial axially separated disks. This minimum fatigue factor comes from two sources. One is the minimum energy transferred from the disk separator to the disks in the stack during access opening; and the second is a minimal axial displacement of the disk as it rides over the disk separator, which is a fundamental harmonic following the path 107 of FIG. 11 and as seen in FIG. 9. If other configurations were used, the particle path as it travels over the disk separator could be line 108 having a sharp change in velocity at 109 or a greater axial displacement. The smooth axial displacement curve 107 tends to reduce the fatigue factor of axially displaced disk portions. This is a second advantage of the primary bending mode and of the chordal displacement disk separator, particularly when the highly preferred small angles of less than 17° have been chosen with respect to the storage access opening.

The Primary Bending Mode

Figure 10:
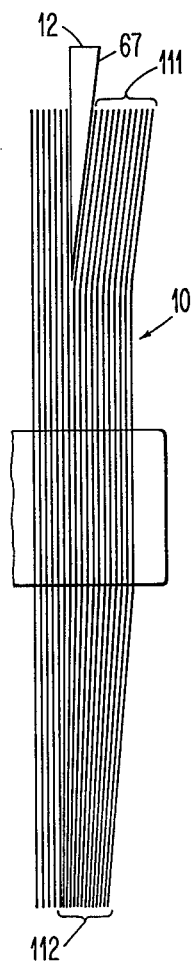
FIG. 10 is a diagrammatic showing of a primary bending mode action of an axial stack of circularly rotating record disks.
Figure 11:
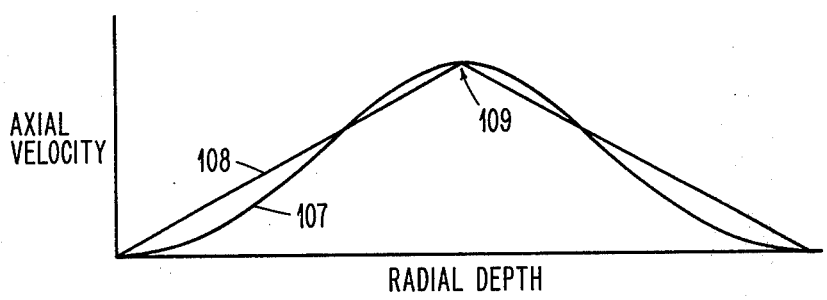
FIG. 11 is a graphical illustration of the axial motion of a record particle on a record member as it travels over a disk separating surface of a chord roll arm disk separator constructed in accordance with the present invention.

The primary bending mode of a disk stack is diagrammatically illustrated in FIG. 10. Separator 12 being radially inserted in the stack 10 causes an axial outward deflection of a segment of disks 111 adjacent to disk separating surface 67. When separator 12 operates on a chordal line, generally a primary bending mode is induced or excited into the stack of disks 10. This means that the disks in the diameter opposite disk separator 12, as at 112, tend to be compressed together; i.e., the axial spacing between adjacent disks is less than it is anyplace else in the disk stack. Intermediate the compressed area 112 and the access opening separation by disk separator 12, the axial separations of the disk follow a somewhat sine wave configuration. The primary bending mode is readily identified in a stack of disks by one cycle of axial spacing perturbations of the disks adjacent the stack-splitting access opening; there being a rarification or greater axial separation and a compression or closer axial spacing of the diameter opposite to such access opening. BY reconfiguring the disk separator, such as that taught by Barbeau et al, supra, a secondary bending mode may be induced or excited in stack of disks 10. In such an instance, there are two axial space rarifications—one at the access opening and one on the diameter opposite such access opening. On the extremities of the diameter transverse to the diameter between access opening by separator 12 and at 112 are the compression or two circumferential areas wherein the disks 10 are axially closest together. Comparing this situation with the primary bending mode, there are two rarifications and two compressions yielding two cycles of perturbations of disks 10. Higher order modes also can be induced by applying appropriate exciting forces to the disk stack. Generally, the higher order the mode, the greater the energy required to induce that mode. Accordingly, the primary bending mode is the lowest energy access opening generating mode available. For this reason, Applicants highly prefer the chordal-arranged disk separator 12 and its manner of separating the disks as above described.

Another aspect with regard to fatiguing of disks 10 is that the access opening should provide a minimum angle. In this regard, mounting head 21 integrally with a disk separator minimizes the opening in that no separate head mounting apparatus need be inserted into the access opening. While a separate arm could be used to mount a head and move it into opening 96 (FIG. 9), it is believed by the Applicants that the physical location of head 21 is more advantageously located in the illustrated position than in opening 96. An important factor in successful recording and reproducing using flexible circular record disks is to provide a stable platform for recording; that is, the relationship of lower disk 64 of FIG. 7 with respect to head 21 must be as consistent and predictable as possible as the stack rotates past the head. Any fluttering or other perturbations by lower disk 64 yields unreliable recording. In accordance with the present invention, stability of the disk adjacent a disk separator is greatest when the entire disk surface passing adjacent a disk separator has a predetermined flying or travel path relationship to the surfaces of the disk separator; i.e., a greatest amount of control of such disk is achieved. Stabilizing surface 68 may be contoured to aid in disk 64 stabilization. For example, the area surrounding head 21 may be given a depending bulbous shape for reducing the surface area over which disk 64 must closely move.

In accordance with the above teaching, mounting head 21 in a disk separator, whether it be in a primary, secondary, or higher order bending mode access technique, is advantageous because it minimizes the access opening while providing a highly stable relationship between a disk with which signals are to be exchanged and the head. For example, referring back to FIG. 9, if the configuration of disk separator 12/12B was changed to that of the so-called splitter in the Barbeau et al apparatus, supra, yet head 21 is mounted in such apparatus, the access opening of the Barbeau et al apparatus could be minimized using the above teachings while exciting a secondary bending mode in a stack of disks. In that application, it would be expected that a small opening 96 would appear at both upstream and downstream sides of the separator, such as indicated by numeral 115 on the upstream end of disk separator 12/12B. Accordingly, it is advantageous to integrally mount a head in a disk separator irrespective of the stack bending mode employed. Insofar as this aspect of the invention is concerned, selection of the bending mode is a function of choice of the designer. The inventive bending mode is highly preferred in that the combination of integrally mounting a head in a disk separator, plus the primary bending mode, appears to Applicants to provide the most advantageous accessing of a stack of flexible circular rotating record disks.

While the primary bending mode is most advantageously employed with a chord roll type disk separator 12, the primary bending mode can be achieved with the Barbeau et al apparatus. It has been observed that for small radii disks (less than 12-inch diameter) or relatively thick disks (greater than 0.001 inch thick), the Barbeau et al apparatus, if properly radially inserted in a disk pack rather than along a chord as Barbeau et al suggest, a primary bending mode can be induced in such pack. For large diameter and extremely flexible disks, the chord roll separator was found to be more suitable for such bending mode. In some disk separations, transactions between primary and secondary bending modes can occur when the Barbeau et al or similar apparatus is employed.

Head Mounts for a Disk Separator

Figure 16:
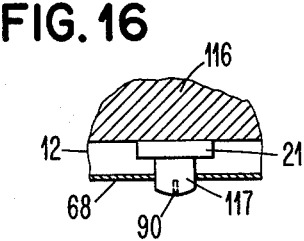
FIGS. 16–19 are diagrammatic illustrations of various disk separator integral mounts for transducer apparatus.

There are several ways to mount a head in a disk separator. Depending upon the physical characteristics of the apparatus being constructed, that is, the flexibility, resiliency, compliancy, spacing, speed of revolution, diameter of the disk, angle of the disk separator, diameter of the mounting hub, and the like, heads may be mounted using several techniques. The simplest, shown in FIG. 16, is to securely mount the head on a frame portion 116 disk separator 12. Head 21 has a transducing portion 117 including gap 90 extending axially outward of separator 12 through reference or stabilizing surface portion 68. It is preferred, but not necessary, that the axially facing surface of transducing portion 117 have a general spherical configuration with gap 90 at the axial outermost portion thereof.

Figure 17:
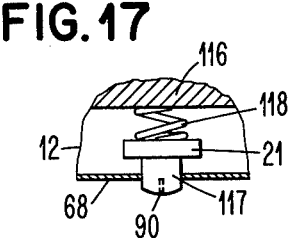

A second mount is shown in FIG. 17 wherein helical spring 118 (or any other form of spring) is interposed between transducer 21 and frame portion 116 with the remainder of the head 21 being constructed identically to the head illustrated in FIG. 16. In both FIGS. 16 and 17, gap 90 has its width as indicated by the dotted line to scan a track which would go into the paper as viewed in those two figures.

Figure 18:
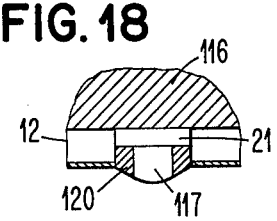
Figure 19:
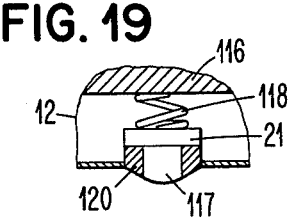

FIGS. 18 and 19 are modifications of FIGS. 16 and 17, respectively, but having an additional slider ring 120 circumscribing the transducing portions 117, respectively. Slide ring 120 tends to provide a better recording platform in that the dimple formed in lower disk 64 of FIG. 7 is broader and not only tends to provide a more stable flying height between medium 64 and transducing gap 90, but also reduces the possibility of head 21 catching an edge of a record disk as the head enters the disk pack volume. Other head mounts can also be successfully used in connection with practicing the present invention. A particular head mount, different from those described above, is later described with respect to FIGS. 23–25.

One important aspect of this invention is mounting a head in a disk separator having two axially oppositely facing disk stabilizing/separating surfaces. Such a separator enhances apparatus operation.

Symmetrical Disk Separation

As mentioned above, certain advantages can accrue if the access opening is provided by a disk separator or pack splitter which is symmetrical about a plane perpendicular to the axis of rotation of the disk stack-/pack. One advantage is that a head can be extended through both surfaces of such a disk separator. For example, referring to FIG. 14, a symmetrical disk separator 124 is carried on access apparatus 11 and mounted on frame 14, such as described with respect to FIG. 1. Disk separator 124 mounts two heads 21 and 21A for transducing engagement with the adjacent disks of access opening 125 shown as being open in the stack of disks 10 for illustrating the symmetrical action of disk separator 124. In this regard, the action of disk separator 124 is substantially the same as disk separator 12 insofar as primary bending mode and chordal action is concerned. Cross-sectionals of such separators as taken along line 6—6 of FIG. 4, for example, are shown in FIG. 6. An early symmetrical separator is shown at 126 wherein but one head 21 is mounted. The plane perpendicular to the axis of rotation is at 127 with the stabilizing surface 128 distending a relatively small angle with respect to plane 127. An angle of preferably not greater than 17° is distended between the stack opening surface 129 and the stabilizing surface 128. One advantage of the symmetrical arrangement is that the deflection of the adjacent disks, such as disks 63 and 64 of FIG. 7, is minimized even though the angle of access opening remains the same. The same symmetrical configuration as at 126 (FIG. 6) is shown at 131, but having two heads 21 and 21A, respectively, or surfaces 128 and 129. With configuration 131, flexible record members have magnetic oxide coatings on both axial facing surfaces with the deflection of the disks being the same by both surfaces 128 and 129. While it is most desired to have a nondeflected disk as the disk being transduced, the symmetrical opening provided by configuration 131 is a compromise for increasing the volumetric efficiency of the signal storage apparatus. By having double surfaces, the effective volumetric density is also doubled. Other configurations of symmetrical opening are shown at 132 for concave surfaces having heads 21 and 21A and at 133 for convex surfaces with heads 21 and 21A. Note that the placement of the heads in configurations 132 and 133 varies from the leading or entering edge 60 because of the concave and convex surface configurations, respectively. In the symmetrical configuration, configuration 131 is preferred.

Variations between configurations shown in FIG. 6, wherein the stabilizing surface 68 is ideally perpendicular to the axis of rotation of disk stack 10, can be achieved by having a slight angle thereto with respect to the axis of rotation; that is, instead of a 90° angle distended between the stabilizing surface and plane along the axis of rotation, an angle of 85° is provided. That is, the stabilizing surface would distend at an angle of about 5° with respect to the plane perpendicular to the axis of rotation thereby reducing the angle of deflection of the upper disks, such as disk 63 of FIG. 7, by 5°. When a large number of accesses is to be made to a signal storage apparatus of the type described, changes in angle can reduce the fatigue and, hence, increase longevity of the apparatus. The small angle of the stabilizing surface from true perpendicularity to the axis of rotation is believed not to substantially degrade the relationship between the record medium and the transducer. This is particularly true when transducer or head 21 extends axially outward of the reference surface as shown in FIG. 7 for dimpling the medium being transduced.

Returning now to FIG. 14, with a symmetrical access opening 125, care must be exercised to allow for axial movement of the segments of the disks being deflected while providing disk stack stability. In accordance with another aspect of the present invention, axial deflection of the segments of the disks in the stack is accommodated even though a pair of axially facing rigid stabilizing members 23 and 26 is provided. In accordance with this aspect of the invention, a center portion 136 of disk stack 10 contains record disks having magnetic coating and having an axial spacing of 0.003 mil, for example. Axially interleaved between the center portion 136 and the stabilizing end plates 23 and 26, is a set of circular disks as at 137 and 138 having an axial spacing greater than the axial spacing (for example 0.010 mil) between the record disks in section 136. With the greater axial spacing between adjacent disks and the axially interleaved sections 137 and 138, for a given axial separating force, a greater deflection is permitted without exerting an axial force against the rigid plates 26 and 23. For example, if the axial outermost disk, as at 139, is to be accessed by disk separator 124 for transducing operations, deflection of that disk would also deflect disks in section 137. Since the axial spacing between adjacent disks in section 137 is greater, a fewer number of disks are axially deflected for a given size access opening. Hence, these additional disks accommodate the axial deflection of the axial outermost record disk 139. The axial spacing between the disks in the axial interleaved sections 137 and 138 can vary for providing a smooth axial resisting force against the generation of an access opening 125; or, in the alternative, the axial spacings between adjacent disks can be made greater, for example, 25 mils as opposed to 3 mils. If a variable spacing is desired, a sinusoidal variation may be employed. A given axial spacing between axially adjacent disks in portions 137, 138 can be greater than, less than, or equal to axial spacing between any two record disks.

The action of spaced disks in axial areas 136, 137, and 138 during disk separation is that of a variable rate spring (graded spring constant) adjacent the respective rigid end plates. Other arrangements may be used to achieve such variable spring rate. Such arrangements include combinations of disks having different resiliencies and diameters plus differing axial spacings. Yet other arrangements should be readily apparent to ones skilled in these arts.

The above-described stack configuration having sections 136, 137, and 138 can also be applied for transducing operations with respect to the disk separator configurations 82, 83, and 86 wherein the stabilizing surface is at or substantially at a perpendicular plane with respect to the axis of rotation. In the latter, the center section 136 extends axially almost to plate 23 with a relatively short axially interleaved section 138, for example, containing six disks as opposed to 50 disks in the symmetrical configuration. With a smaller buffer of axially increased, spaced-apart circular disks, the dimpling of a head 21 into the axially outermost record disk 140 is accommodated. At the opposite axial end, section 137 would be the same length, i.e., contain 50 disks, as for the symmetrical configuration. As the angle of access opening, such as at 125 and as described with respect to FIG. 7, is increased, the axial length of the interleaved sections 137 and 138 must be correspondingly increased. Accordingly, the axial length of the axially interleaved sections is a function of the access opening angle. If the different diameter disks are selected, for example, rather than an 18-inch diameter disk, a 36-inch diameter disk is provided, then the axial length of the interleaved sections 137 and 138 must be increased for a given angle opening to accommodate the greater axial deflection of the outer circumference of the greater radii disk. The axial radius of the disk in the axially interleaved sections 137 and 138 can vary from the diameter of the record disks in section 136. The composition of such disks can be different; they can provide a certain resiliency for improving the closure properties of the disk stack. However, they also may be made of the same material as the record disks and actually can be record disks which are not accessed for storage purposes. The spacings between disks must be sufficiently small to couple the visco-elastic forces between the axially adjacent disks.

Figure 14A:
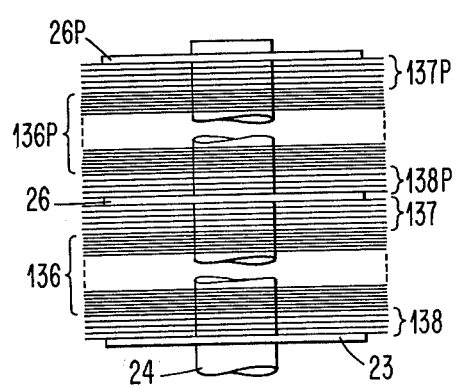
FIG. 14A is a second showing of the FIG. 14 illustrated apparatus but including a removable stack of record disks (pack) on a fixed stack of record disks.

The configurations of FIG. 14 can be modified to that as shown in FIG. 14A to employ the present invention with that of U.S. Pat. No. 3,566,381 wherein a removable disk pack is insertable on and operable with a stack of disks mounted on the rotating shaft 24. FIG. 14A does not show the accessing apparatus, it being understood that such accessing apparatus will access all of the disks in the central portions 136 and 136P. The portion of the disk stack between plates 23 and 26 is as described with respect to FIG. 14. Additionally, a disk pack 145 is mountable onto shaft 24 in the manner as described in U.S. Pat. No. 3,566,381. Instead of having a single rigid disk as shown in that patent, a plurality of record disks in section 136P is provided with a set of axially interleaved disks 138P to abut fixed plate 26, plus a second set of axially interleaved disks 137P to abut fixed plate 26P, the suffix "P" indicating that the corresponding parts are in the removable disk pack. In the alternative, sections 137 and 138P may be dispensed with, with the record section 136P being disposed immediately axially adjacent section 136. In this latter case, plate 26 is also dispensed with.

Figure 15:
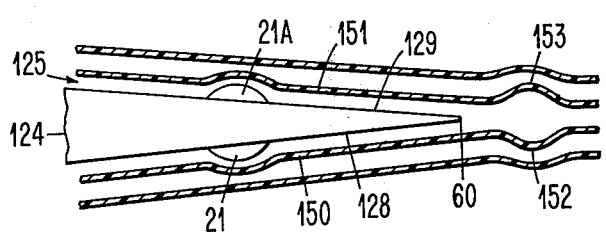
FIG. 15 is a diagrammatic showing of disk separation employing a symmetrical disk separator.

Referring next to FIG. 15, the interaction between a pair of disks bracketing an access opening 125 with respect to a symmetrical disk separator is described. Separator 124 has a pair of axially oppositely facing heads 21 and 21A respectively in transducing engagement with a pair of disks 150 and 151. Because of the slight deflection angle, disks 150 and 151 maintain a relatively stable recording platform including a positive pressure against the heads 21 and 21A. Because of the radial accessing force of disk separator 124, each of the disks 150 and 151 have a bow wave as at 152 and 153, respectively. By moving the heads 21 and 21A radially outwardly from the entering edge 60 of disk separator 124, any perturbations from box waves 152 and 153 are essentially stabilized such that a predictable recording platform is achieved. Again, the radius of curvature at 60 is preferably not less than 0.010 inch. Because of the lesser force between disk separator 124 due to its reduced angle of axial deflection of disks 150 and 151, the later-described increased air pressure in the entry edge portion 60 can either be reduced or dispensed with while achieving a degree of safety of avoiding contact between the entry edge portion 60 and either of the disks 150 or 151 bracketing access opening 125. As in the asymmetrical or wedge-shaped disk separator, it is preferred that the adjacent disks 150 and 151 have a continuous air foil relationship with the surfaces 128 and 129 of disk separator 124 and as described earlier with respect to FIG. 7.

Disk Separation Including FLuid Disk Separation

As above described, all of the disk separators in their various configurations have not included any fluid communication means. In certain instances, depending upon the characteristic of the disk stack, fluid communication means within a disk separator 12 or 124 (FIG. 14) can provide additional stability to the disk adjacent the access opening for preventing wear, i.e., contact with the disk separator, as well as a smooth flow of the record medium over the stabilizing surfaces. It must be remembered there is radially outward air flow between all of the adjacent disks for providing disk rotation stability as previously described by Penfold et al. Any air or other fluid emanating from a disk separator adds to this flow and tends to flow in a circumferential sense; that is, for ultimate stability, it is desired that the circumferential distribution of air flow be as uniform as possible. With an access opening in a stack of disks generated by any disk separator, the spacing between the adjacent disks, such as disks 150 and 151 (FIG. 15), may increase; i.e., the open space between the disk 150, its surface 129, and stabilizing surface 128 spaced from lower disk 151, may actually increase the space for air flow, hence, tends to reduce the pressure between disks 150 and 151. This action tends to draw the disk closer to disk separator 124. In some embodiments, such close spacing can enhance the transducing relationship between a head and the adjacent record medium. In other cases, it may be desirable to maintain a greater spacing between entry edge portion 60 and the adjacent disks 150 and 151 than between the transducers 21, 21A and the respective disks 150 and 151. Further, to avoid wear, upon the onset of disk separation as illustrated in FIG. 4 and also as shown in the position for separator 124 in FIG. 14 (assuming access opening 125 is closed), there is very minute separating force exerted on a disk by the entry edge portion 60. Accordingly, fluid communication means in a disk separator 12, 124 can provide additional disk separating forces at the onset of disk separation or stack splitting. In these regards, the fluid communication means diagrammatically illustrated in FIGS. 20–22 apply to all disk separators described in this application.

Referring more particularly to FIG. 20, controllable air supply 155, which can be a part of air supply 22 in FIGS. 1 and 14, may have, for example, fluid communication tubes 156, 163, 173 to disk separator 12 for providing three separate pressure areas on disk separator 12. A first pressure area 160 has relatively high pressure; for example, 3 psi at tube 156. From tube 156, air is supplied through tube 158 internal to separator 12 to the initial entry area at 155 wherein a relatively high density of readily disposed fluid communication ports of 0.005 inch diameter extend through both upper and lower separating surfaces. In the remaining portion of area 160, the apertures are on a rectangular coordinate of ¼ inch spacings. This additional pressure at the initial entry point assists in separating the upper disk 63 (FIG. 7) from the disk separator at the point of minimum entry speed and minimum area exposure between the disk 63 and separating surface 82. In a similar manner, the greatest force exerted by a disk being separated or axially bent along a chordal line exists along the entry portion 60E. Accordingly, in the area 160, the same aperture spacing for a set of fluid communication ports is provided along the entire length of disk separator 12. In this regard, pneumatic tube 158 extends to a plenum formed contiguous with edge 60 as at 162. Over a large portion 161 of the disk separating surface 82, lower pressure air flows through a set of apertures or fluid communication ports set on cartisian coordinates with ½ inch spacing and with a diameter of the ports of 0.005 inch from a separate plenum inside the disk separator connected to air tube 163. Intermediate pressure area 164 may be located adjacent entry 55 and receives air at an intermediate pressure via tube 173. Stabilizing surface 68 has a fewer number of fluid communication ports on cartisian coordinates of ¾ inch, for example, to provide air flow between surface 68 and lower disk 64 (FIG. 7) for maintaining a supply of air flow radially outward and a given spacing between disk 64 and stabilizing surface 68. In this instance, head 21 extends substantially axially outwardly from surface 68 to form a dimple in disk 64. On those disk deparators having a truncated trailing edge, such as 60C, a high pressure (3 psi) area 165 adjacent truncated edge 60C is provided. Plenum 162 then extends to be contiguous with edges 60E and 60C. When truncated as indicated by line 60C in FIG. 20, head 21 is moved away from the high pressure area into area 161 as at 166.

Figure 21:
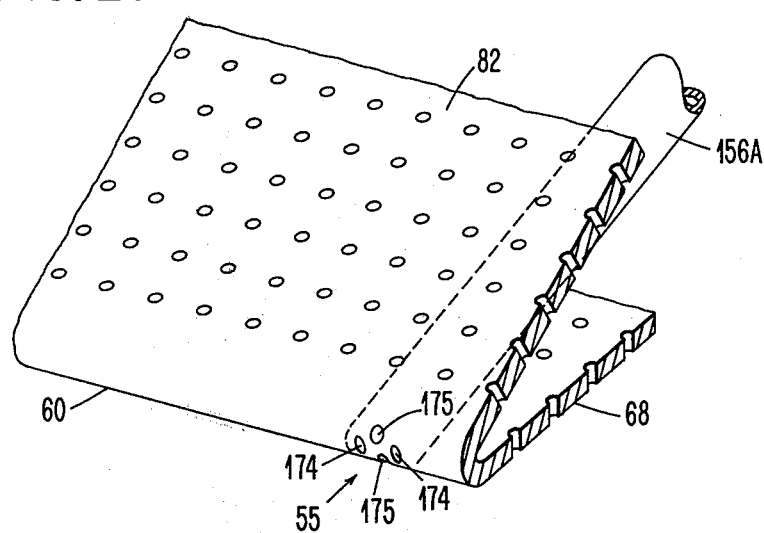
FIG. 21 is a slightly enlarged partial perspective diagrammatic view of a leading edge portion of the FIG. 20 illustrated apparatus.

As mentioned earlier, at the onset of separator penetration into the disk stack, the greatest chance of unintended contact between a record disk and entry portion 60 occurs. To eliminate this problem, air supply 155 may have a control based upon a tachometer 170 attached to arm 12' at pivot 56. A cam or dog 171 extends radially outward to actuate switch 172 in a momentary manner, i.e., for a pivot distance of about 2°, for example, to provide a ground reference potential to control circuits (not shown) in air supply 155. Such control may be a solenoid actuated to open a valve providing a pulse of air from supply 155 through tube 156A to radially inwardly facing fluid communication ports 174 and axial ports 175 (FIG. 21). Air flowing from tube 156A (FIG. 20) through these two ports at 55 at the onset of separator penetration tends to separate the two disks 63 and 64 due to the jet of air from these two ports. After disk separator 12 has entered the stack and disks 63 and 64 have been separated, such air flow from ports 174 and 175 is no longer needed and can actually add to the instability of the disk stack. Accordingly, it is desired that after a predetermined disk separator entry, these ports should be closed. Then cam 171 opens switch 172, thereby turning off the air supply.

Based upon the above discussion, the radial length 176 of the entry portion 160 high pressure port area can be varied in accordance with design considerations, i.e., the flexibility of the disks being separated, the diameter, resiliency, etc., for achieving optimum spacing between the disks abutting the access opening for providing a good transducing engagement.

Figure 22:
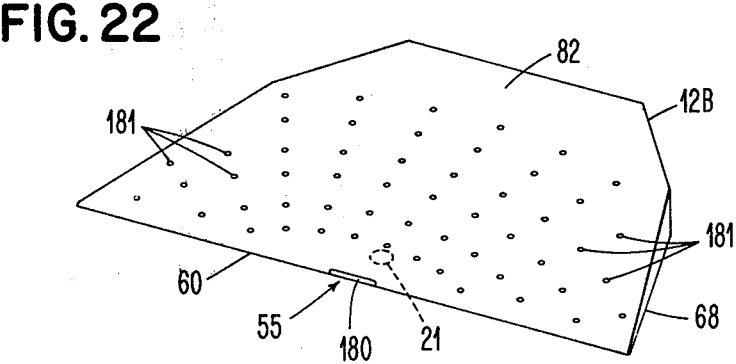
FIG. 22 is a diagrammatic perspective view of a disk separator having a second hols pattern and fluid communication means.

Referring now more particularly to FIG. 22, a second disk separator 12B is shown. It is remembered that disk separator 12B operates on a radial motion as opposed to a pivoting or complex motion of disk separator 12. In this regard, the point of entry 55 is at the point of disk pack entry edge portion 60. In this instance, because of the increased force required to enter the disk stack, a slot 180 is connected to tube 156 of FIG. 20 for providing an initial disk-separating force. A pulse of air through slot 180 may also have to extend over a greater degree of penetration of disk separator 12B into the disk stack. Radially outward of slot 180 are sets of concentric lines of fluid communication ports 181 at increasing radial differences for providing air flow on upper or disk separating surface 82 to provide an air flow to maintain disk separation as above described. Transducer 21 extends through the lower or stabilizing surface 68 as aforedescribed and is radially aligned with slot 180; i.e., a line drawn through the center of slot 180 and head 21 also lies along the axis of rotation of the disk pack. The configuration of hole patterns described with respect to FIGS. 20 and 21 may also be applied equally to the FIG. 22 illustrated embodiment. The plenum in disk separator 12B may be constructed as a honeycomb structure for not only providing air flow, but also light-weight rigidizing structure for the disk separator. Arm 12A may also have air ports for disk separation purposes.

A Preferred Head Mount in a Separator

Figure 23:
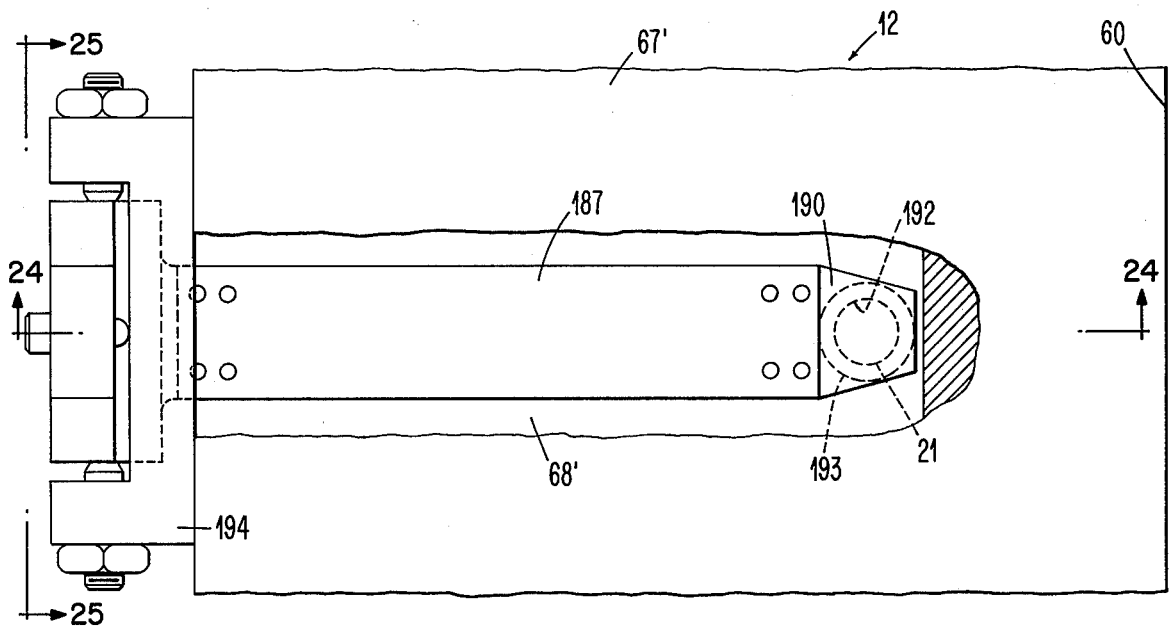
FIG. 23 is a diagrammatic plan view of a presently preferred head mount usable to mount a head within a disk separator.
Figure 24:
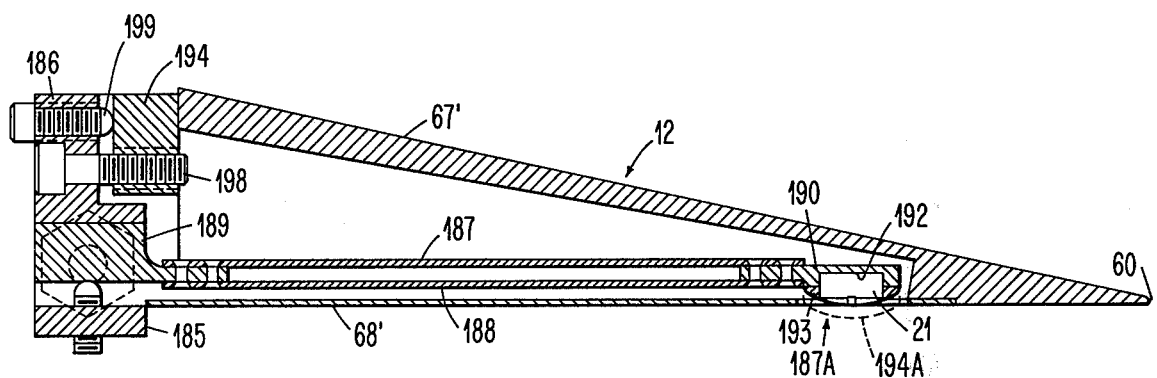
FIG. 24 is a diagrammatic sectional elevational view of the FIG. 23 apparatus.
Figure 25:
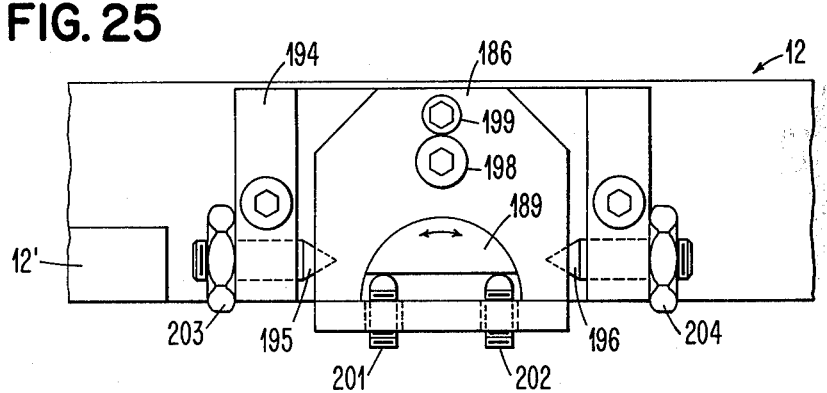
FIG. 25 is an end sectional elevational view of the FIG. 23 illustrated apparatus as taken along lines 25—25 in a direction of the arrows.

Referring collectively to FIGS. 23–25, a preferred head-mount installation in a chord roll arm or wedge-shaped disk separator is shown. The wedge-shaped disk separator consists of an upper plate 67' which forms the disk separating surface, as well as the entry edge 60. The stabilizing surface is formed by a flat apertured plate 68' which extends from shoulder 185 on support block 186. Support block 186, in turn, is mounted on arm 12', such as shown in FIG. 1. The head 21 is mounted in the hollow interior of disk separator 12 and extends through aperture 187 in bottom plate 68'. The mounting is adjustable, as will be later described. A pair of extending resilient leaf springs 187 and 188 is fixedly secured to head mounting block 189 to support the head assembly 190 for yieldably urging head 21 into a transducing engagement just below bottom plate 68' when viewed as shown in FIG. 7. Head mount 190 is fixedly secured to spaced leaf springs 187 and 188 as best seen in FIG. 24. In the illustrated embodiment, head 21 is epoxied into an annular recess 192 of head mount 190. For increased stability of the recording platform, i.e., for a more consistent head-to-medium interface with and a lesser chance of head 21 catching on disk 64, for example (FIG. 7), slider ring 193 is epoxied about the depending portion of head 21. Ring 193 is the equivalent of ramp 89 of FIG. 7. As shown in FIGS. 24, head 21 is in a transport position, i.e., preassembly position. After the disk separator is mounted on a signal storage apparatus, such as shown in FIG. 1, adjustments are made, as will be described, moving head 21 to the position of dotted line 194.

A main advantage of the FIGS. 23–25 illustrations is that head tension can be adjusted without disassembling the signal storage apparatus and can be adjusted while the disk separator is in an accessing position with head 21 supposedly in transducing engagement with a disk 64 (FIG. 7). In this manner, the tension on the head 21 is adjusted for optimum recording and reproducing relationship with a critical disk, such as an end disk 139 (FIG. 16), for ensuring satisfactory recording and reproducing operations in the entire signal storage apparatus.

Internal head support member 186 is pivotally secured to outer U-shaped support block 194, which is in turn secured to arm 12 by bolts or welding. A pair of adjustable pins 195 and 196, threaded in outer block 194, pivotally secures inner head mount 186 as best seen in FIG. 25. The radial adjustment of head 21, as best seen in FIG. 24, is by fine-threaded set screw 198 which is extended through an aperture in the inner head mount block 186. A threaded stop 199 controls the pitch of head 21.

Additionally, set screws 201 and 202 act as stops against the lower spring member 188 as best seen in FIG. 25. By adjusting the nuts 203 and 204 on pivot pins 195 and 196, respectively, plus the set screws, head 21 is accurately positioned in aperture 187A with the tension supplied by leaf springs 187 and 188 being in accordance with the adjustment of set screw 199.

While FIGS. 23–25 show no fluid communication means, such means may be added using known assembly techniques in accordance with the teachings of FIGS. 20–22.

Description of a Preferred Disk Stack Assembly

With reference to FIG. 26, a multiple flexible disk file assembly includes stack 10 of flexible magnetic disks mounted to a rotary spindle assembly 24 that is rotated by a drive motor 13. Air pressure source 22 supplies air at a predetermined pressure via plenum 210 to the interior of the tubular or hollow spindle 24, which has uniform slots or apertures 211 to receive air. From spindle 24, air flows out and is distributed radially outward between each of the disks 10 via ports 212 and axial slots 213.

Symmetrically configured washer-shaped spacers 214, disposed axially between the record disks, provide close and uniform axial spacing of the disks, while permitting the above-described radial air flow. That is, spacers 214 consist of a fine wire mesh, made from polyester, nylon, metal, or other durable material.

In operation, air pressure from source 22 goes through coupling device 215 into plenum chamber 210 which is in fluid communication with spindle assembly 24. Pressurized air is directed through the apertures 211 into the center of hollow spindle 24 and forced through ports 212 into axially extending or longitudinal slots 213 that are disposed in a collar 216, encompassing a portion of spindle 24 adjacent to the stack 10 of disks. The air is expelled radially outwardly from inner radius and flows to the outer periphery of each of the disks and then to ambient air. The air that flows between the disks and through the spacers provides an equalizing condition, such that the disks each rotate in equilibrium in substantially parallel planes transverse to the axis of rotation of stack 10.

With the record disks in rotation, the wedge-like disk separator 12 creates the previously described transducing access opening to the stack.

While the invention has been particularly shown and described with reference to a preferred embodiment thereof, it will be understood by those skilled in the art that various changes in form and detail may be made therein without departing from the spirit and scope of the invention.

What is claimed is:

1. The method of operating signal storage apparatus having a stack of closely spaced-apart coaxial compliant circular record disks having a common axis for rotation at the center of all said circular record disks, the steps of:
  rotating said stack of disks as a unit about said common axis;
  applying first axial separating forces at a given radius to one of said disks to induce a primary bending mode in said stack;
  applying additional axial separating forces in a predetermined radial juxtaposition to said first axial separating forces for axially moving a segment of said one disk by said separating forces to create a single harmonically shaped disk pack opening while maintaining said primary bending mode;
  exchanging signals with a record disk abutting said opening; and
  removing said axial separating forces from said one disk.

2. The method set forth in claim 1 further including the step of simultaneously applying said axial separating forces along chords of said one circular record disk such that said opening exhibits a line of transition along a chord.

3. The method set forth in claim 2 further applying said chordally aligned axial separating forces as a full chord during a first portion of creating said disk pack opening and, after reaching a predetermined point, reducing said forces to a subchordal portion on said one circular record disk.

4. The method set forth in claim 2 including in said axial separating step applying said chordally aligned forces along complete chords during the creation of said disk pack opening;
  maintaining said disk pack opening with such chordal forces; and
  removing said axial separating forces along a radius while maintaining said chordal alignment.

5. The method set forth in claim 2 further including sequencing said axial separating forces from a minimum radially entering velocity upon initiation of said opening to a maximum radial and axial separating velocity as said opening increases axially.

6. The method set forth in claim 2 further including the step of limiting the opening angle taken along any radius of said one circular record disk to being not greater than 17° between the disks abutting said opening.

7. The method set forth in claim 1 further including simultaneously applying stabilizing axial forces on a second circular record disk abutting said opening opposite said one circular record disk.

8. The method set forth in claim 7 further including applying said axial separating forces and said stabilizing forces simultaneously and moving said forces radially inwardly toward the center of said circular record disk at an initial minimum velocity and increasing to a maximum radial inward velocity as the opening increases toward its maximum opening angle.

9. The method set forth in claim 8 further including applying said axial separating forces and said stabilizing forces along chords of said circular record disk.

10. The method set forth in claim 1 further including operating with record disks having a magnetic surface on one axial facing surface thereof,
  the method improvement further including the steps of:
  stabilizing a second one of said circular record disks which abuts said opening; and
  exchanging electrical signals with said record disk while said disk stack is opened.

11. The method set forth in claim 1 further including the step of imparting a given radial inward velocity to said axial separating forces beginning at an initial minimum velocity adjacent an outer periphery of said one circular record disk and increasing said radial inward velocity while changing the vector direction thereof spirally such that a given force vector will follow a spiral with respect to the center of rotation of said one circular record disk.

12. The method set forth in claim 11 further including moving a transducing means into said opening coincident with creation of said opening and including the step of selecting a position for said transducing means with respect to said initial entry such that the radial inward velocity of said initial entry is always less than the initial entry velocity of said transducing means.

13. A signal storage apparatus having an axial stack of a plurality of coaxial planar compliant circular record disks and having a common axis extending through the center of each said circular record disk, said stack mounted for rotation as a unit about said common axis, a positioning apparatus adjacent said stack capable of axial and radial motions with respect to said disks, signal transducing means movable with said positioning apparatus,
  the improvement including in combination:
  a disk separator on said positioning apparatus comprising a wedge having an entering edge facing said stack and lying in a plane substantially parallel to said planar disks, said wedge including a pair of surface portions diverging at an angle opening radially outward of said stack of not greater than approximately 17°, one of said surface portions being a stack opening surface portion contiguous with said entering edge and extending axially at said opening angle; and
  said wedge having an extent transverse to said common axis such as to form a chord on said disks as said positioning apparatus moves said wedge in a radial inward direction, said entering edge being longer than a maximum length chord at maximum radial penetration into said axial stack of disks.

14. The signal storage apparatus set forth in claim 13 having a disk separator with a radially outwardly opening separating angle in the range of 4° to 12°.

15. The signal storage apparatus set forth in claim 13 wherein said stack opening surface portion has an axially outwardly facing concave configuration extending radially outwardly from said entering edge and including an angle less than 17° immediately adjacent said entering edge and increasing to a greater angle still less than said 17° and said concave surface lines of equal spacing from a plane transverse to said common axis and lying along a chord of said compliant circular record disk.

16. The signal storage apparatus set forth in claim 13 wherein said stack opening surface portion has a convex shape wherein the maximum angle of said convex shape surface portion in proximate axial separating force relationship to one of said compliant circular record disks to be axially moved for creating an access opening is not greater than said 17°; and
  transducing means on said disk separator on a surface thereof opposite to said convex surface.

17. The signal storage apparatus set forth in claim 13 wherein said wedge includes fluid communication means having at least one port adjacent said entering edge portion.

18. The signal storage apparatus set forth in claim 13 further including pivot means on said positioning apparatus;
said disk separator being pivotably mounted on said pivot means; and
means for rotating said disk separator about said pivot means to effect said radial motions for insertion and extraction to and from said stack of disks such that said disk separator moves in an arcuate path including a substantial radial motion component with respect to said circular record storage disk.

19. Signal storage apparatus set forth in claim 18 wherein said stack rotates in a first sense;
said pivot means being located at a first circumferential location with respect to said stack; and
said disk separator having an entry point into said stack which is downstream from said pivot means, said transducer means being on said disk separator in a downstream position with respect to said entry point, such that a given point on the periphery of a given one of said circular record storage disks first passes said pivot point means, then said entry means, and then said transducing means.

20. The signal storage apparatus set forth in claim 18 wherein said disk separator has a disk stabilizing surface extending from said entering edge at an angle of not greater than said 17° from said stack opening surface portion; and
said transducing means being mounted along said stabilizing surface portion and extending axially outwardly therefrom.

21. The signal storage apparatus set forth in claim 20 further including an air supply;
means connecting said air supply to said disk separator; and
said disk separator having fluid communication means therein, plus a plurality of first fluid communication ports at least along said stack opening surface portion in juxtaposition to said entering edge portion.

22. The signal storage apparatus set forth in claim 21 wherein said disk separator has a further plurality of second fluid communication ports extending through said stack opening surface portion including ports radially remote from said entering edge portion.

23. The signal storage apparatus set forth in claim 22 wherein said disk separator fluid communication means supplies fluid at a greater pressure through said first ports than through said second ports.

24. The signal storage apparatus set forth in claim 13 wherein said disk separator has an average angle of radial outward opening in the approximate range of 4° to 12° and said stack opening surface portion is an axially outwardly facing concave surface having isogrammic distance lines from a plane transverse to said common axis extending along chord lines of said disks; and
said disk separator surface portions both extending from said entering surface radially outwardly and along chordal lines parallel to said plane.

25. The signal storage apparatus set forth in claim 24 further including pivot means on said positioning apparatus mounting said disk separator for pivoting action into and out of said stack along a plane substantially parallel to unseparated ones of said disks;
means on said positioning apparatus for pivoting said disk separator about said pivot means; and
said stack having a direction of rotation wherein a point on the periphery of said stack first passes said pivot point, then an entry point on said disk separator, and then past said transducing means.

26. The signal storage apparatus set forth in claim 25 wherein said disk separator wedge has a chordal extent greater than any chord along a given one of said circular record disks at maximum radial stack penetration by said disk separator.

27. The signal storage apparatus set forth in claim 13 wherein said disk separator exhibits symmetry along the axis of said stack about a plane transverse to said stack and said angle of not greater than approximately 17° extends between said surface portions of said wedge symmetrically disposed about said plane.

28. The signal storage apparatus set forth in claim 27 wherein both of said surface portions on said wedge have an axially outward facing concave configuration with equal spacing from said transverse plane along disk chordal lines.

29. The signal storage apparatus set forth in claim 27 wherein said symmetrical surfaces have outwardly facing convex surface portions with isobar spaced lines chordally along said circular record disks.

30. The signal storage apparatus set forth in claim 27 wherein said disk separator wedge has a chordal extent less than a chord of said circular record disk at point of maximum radial stack penetration.

31. The signal storage apparatus set forth in claim 27 having said plurality of compliant circular record disks exhibiting a compliancy whereby separation of two of said record disks by said disk separator establishes a primary bending mode in said stack.

32. The signal storage apparatus set forth in claim 27 wherein said stack has first and second rigid stack stabilizing disks at the axial extremities thereof, plus a plurality of nonrecord circular disks having a given compliancy and interposed axially between each of said rigid disks and said circular record disks.

33. The signal storage apparatus set forth in claim 32 wherein said axially interposed nonrecord circular disks have an axial spacing therebetween greater than the axial spacing between axially adjacent ones of said circular record disks.

34. The signal storage apparatus set forth in claim 27 further including means for receiving fluid under pressure;
said disk separator having an internal fluid communication passageway, and each of said symmetrically axially disposed surfaces having a plurality of ports immediately adjacent said entering edge and distributed equally and symmetrically on said surfaces for providing fluid communication from said passageway to between said disk separator and two disks being separated.

35. The signal storage apparatus of claim 13 further including a disk stabilizing surface opposite said stack opening surface and extending from said leading edge at least than said angle of 17° in a radially outward direction; and
said leading edge having a radius of curvature of not less than about 0.010 inch.

36. The signal storage apparatus set forth in claim 35 wherein said disk separator has a truncated edge portion extending from said entering edge at an obtuse angle with respect thereto such that the chord lines on said disk separator are truncated with respect to the chord lines on the disk being separated; and said transducing means being mounted in the vertex of said obtuse angle.

37. Signal storage apparatus having a coaxial stack of axially spaced-apart compliant circular record disks rotatable about a common axis, positioning apparatus disposed adjacent said stack and having axial and radial positioning movements, the improvement including in combination:

a stack separator on said positioning apparatus and mounted thereon for disk segment axial separating (stack-splitting) motions including a radial motion component, said stack separator having a reference surface portion extending transverse to said common axis, a separating surface portion axially spaced from said reference surface portion and extending transverse to said common axis and a stack entering edge portion joining said surface portions at a radially inward end thereof, said surface portions subtending a radially outwardly opening acute angle; and a transducer mounted in said stack separator and having a transducing portion extending axially outwardly through said reference surface portion for enabling signal exchanging relationships with an axially separated portion of one of said circular record disks.

38. The signal storage apparatus set forth in claim 37 wherein said surface portions have a circumferential extent with respect to said record disks sufficient to establish an air bearing surface with respect to disks being partially axially separated such that said separator substantially fills any opening between two disks being axially partially further separated in said stack at least in a cross-sectional area extending circumferentially on both sides of said transducer and extending radially on both sides of said transducer on both said surface portions such that a positive pressure is applied to said transducing means by said one disk passing said reference surface portion.

39. The signal storage apparatus set forth in claim 37 wherein both said surface portions include convex axially outwardly facing surfaces.

40. The subject matter set forth in claim 37 wherein said stack of spaced-apart compliant circular record disks further includes, in combination:

a rigid circular disk at each axial end of said stack; and a plurality of additional disks spaced intermediate said record disks and said rigid disk with an axial spacing greater than the axial spacing intermediate said record disks.

41. The subject matter set forth in claim 37 wherein said surface portions are symmetrically disposed about a plane transverse to said common axis.

42. The subject matter set forth in claim 37 wherein said stack further includes in combination:

a rigid circular disk at a first axial end of said stack; and a plurality of additional circular disks axially interposed between said record disks and said rigid disk, mounted for rotation with said record disks and being axially spaced apart a distance different from the axially spacing between two of said record disks.

43. In a disk file data storage apparatus having a multiplicity of uniformly axially closely spaced coaxially aligned compliant circular record disks, each circular record member having a surface for bearing record indicia and rotatable as a unit in a first rotational sense, the improvement comprising:

an access apparatus disposed circumferentially adjacent said disks;

means mounting said access apparatus for axial movement along said disks;

radial motion means on said access apparatus for generating motions having a radial component with respect to said disks;

a disk-separating blade on said access apparatus radial motion means having an entering edge portion circumferentially facing into rotation of said disks for axially partially separating two of said disks, a trailing edge portion, and a pair of axially facing intermediate surface portions for respectively establishing an aerodynamical relation to said two disks and joining said edge portions, said intermediate surface portions having axial spacing varying radially in an increasing axial spaced-apart relation along a radial outward direction in a continuous substantially edge-formingless and cornerless manner; and a transducer in said disk-separating blade having a predetermined radial and circumferential location with respect to said entering edge portion, said transducer having a transducing portion extending axially beyond a first one of said intermediate surface portions for facing one of said two disks in a transducing relationship.

44. Signal storage apparatus set forth in claim 43 wherein said intermediate surface portions distend an effective angle of not greater than 17° and which is radially outwardly opening with respect to said circular record members; and said entering edge portion has a radius of curvature of not less than 0.010 inch.

45. Signal storage apparatus set forth in claim 43 wherein said blade includes lines of equal spacing between said intermediate surface portions, which lines lie along a chord of said circular record disks during a one insertion position of said blade in said stack of disks such that a primary bending mode is induced into given ones of said circular record members.

46. The signal storage apparatus set forth in claim 43 including means in said radial motion means for imparting an arcuate motion to said blade for providing an initial minimum radial entry speed of said blade into said stack but with a greater radial entry speed into said stack for said transducer in said blade.

47. The signal storage apparatus set forth in claim 43 wherein said intermediate surface portions distend an angle immediately adjacent said leading edge portion in the range of about 4° to 15° and said transducer being disposed radially outwardly of said leading edge portion.

48. The signal storage apparatus set forth in claim 43 wherein said blade had a chordal extent with respect to said circular record disk such that said disks are separated in continuous constant aerodynamical spacing from said intermediate surface portions for greater than 50% of any access opening in said stack of disks whereby the partial axially separated rotating circular record disks are stabilized.

49. The signal storage apparatus set forth in claim 43 wherein a second one of said intermediate surface portions exhibits a surface configuration yielding a harmonic path for a particle on a disk adjacent said second surface portion as said particle passes over such second surface portion.

50. The signal storage apparatus set forth in claim 43 wherein said intermediate surface portions have a chordal extent of equal distance between said surface portions whereby flexure of disks being separated by said blade is in a chord roll mode.

51. The signal storage apparatus set forth in claim 43 further including fluid communication means in said blade;
  said entering edge portion having an initial enterng portion;
  a first set of ports connecting said fluid communication means through said intermediate surface portions along said entering edge portion and radially outwardly of said initial entering portion for supplying a first fluid pressure thereat; and
  a second set of ports connecting said fluid communication means through another portion of said intermediate surface portions for establishing a lesser fluid pressure thereat.

52. The signal storage apparatus set forth in claim 51 further including entry fluid communication means, connected to said initial entering portion, and said initial entering portion including radial opening fluid communication ports in fluid communication with said entry fluid communication means.

53. The signal storage apparatus set forth in claim 52 further including:
  entry control means indicating an onset of disk stack entry by said initial entering portion; and
  pulse fluid means responsive to said entry control means indicating said onset to supply a pulse of positive fluid pressure to said entry fluid communication means.

54. A signal storage apparatus having an axial stack of a plurality of coaxial planar compliant circular record disks, said stack being rotatable as a unit with an arbor coaxial to and supporting said disks, signal transducing means for exchanging signals with said record disks, a positioning apparatus circumferentially adjacent said stack and capable of axial and radial motions with respect to said stack for moving said signal transducing means into transducing relation with given ones of said record disks;
  the improvement including in combination:
  a wedge-shaped disk separator on said positioning apparatus having an entry edge always chordally aligned with respect to said circular record disks, and said separator having one surface substantially parallel to said circular disks in said stack and a second surface extending from said entry edge radially outwardly at an effective angle to said one surface of less than 17° for separating two of said disks along said chordal lines with a low-energy transfer to said disks.

55. The signal storage apparatus set forth in claim 54 wherein said positioning apparatus inserts said disk separator into said stack such that said disk separator fills at least one-half any access opening created in said stack of disks by such disk separator.

56. The signal storage apparatus set forth in claim 55 further including pivoting means on said positioning apparatus for pivoting said wedge-shaped disk separator about a pivot axis upstream in a rotational sense of entry of said disk separator into said stack of said circular compliant record disks; and
  said signal transducing means being mounted in said wedge-shaped disk separator circumferentially downstream in said rotational sense with respect to an initial point of entry of said disk separator into said stack for disk separation such that the initial disk-separating velocity has a minimal radial velocity of said wedge-shaped disk separator.

57. The signal storage apparatus set forth in claim 55 wherein all radial related motions of said wedge-shaped disk separator are part of a pivoting action about said pivot axis.

58. The signal storage apparatus set forth in claim 55 wherein said surfaces of said wedge-shaped disk separator are substantially symmetrical about a plane perpendicular to said common axis.

59. The signal storage apparatus set forth in claim 58 further including in combination:
  first and second rigid disks secured to said arbor at axially opposite ends for rotation with said stack;
  a second plurality of coaxial planar circular compliant disks axially interposed between said rigid end disks and said record disks and having an axial spacing greater than the axial spacing between said record disks; and
  said signal transducing means consisting of two heads mounted on said wedge-shaped disk separator and axially extending respectively through said surfaces in axially opposite directions outwardly from said disk separator and in juxtaposition to said entry edge.

60. The signal storage apparatus set forth in claim 54 further including fluid communication means in said disk separator;
  means indicating onset of disk separation by said disk separator;
  said entry edge having radially opening fluid ports disposed in immediate juxtaposition to an initial point of entry of said stack and connected to said fluid communication means; and
  means responsive to said indication to supply fluid through said ports for initially partially axially separating a pair of disks in said stack of disks at the onset of disk separator entry into said stack of disks.

61. The signal storage apparatus set forth in claim 60 including a second fluid communication means in said disk separator and said disk separator surfaces each having a plurality of fluid communication ports extending therethrough coextensively with said entry edge and in fluid communication with said second fluid communication means; and
  means supplying fluid to said second fluid communication means continuously while said disk separator is in said stack of disks.

62. The signal storage apparatus set forth in claim 61 wherein said signal transducing means is mounted in said disk separator and extends axially outward thereof through said one surface and disposed in said disk separator radially outwardly of said entry edge fluid communication port area.

63. The signal storage apparatus set forth in claim 62 wherein said second surface has a concave outwardly opening shape such that said angle of less than 17° is a maximum angle distended between portions of said surfaces insertable into said stack of disks.

64. Signal storage apparatus having an axial stack of a plurality of coaxial planar compliant circular record disks with a common axis of rotation, a coaxial arbor mounting said record disks for rotation about said common axis;
  a positioning apparatus circumferentially adjacent said stack and capable of axial and radial motions with respect to said stack;
  signal transducing means movable with said positioning apparatus;
  the improvement including in combination:
  said record disks having a given diameter and exhibiting a given resiliency;
  a disk separation inducing member on said positioning apparatus for movements having a radial component with respect to and into said stack for axially partially separating a given two of said record disks and shaped to establish in coaction with said disks exhibiting said given resiliency and having said given diameter, a primary bending mode in said stack of disks in one axial portion of said stack with respect to said inducing member; and
  means for supporting said signal transducing means axially intermediate said given two record disks for enabling transducing operations with a one of said given two record disks.

65. The signal storage apparatus set forth in claim 64 further including entry control means, said disk separator having fluid communication means including ports for directing fluid into said stack including a radial component of pressure; and
  means responsive to said entry control means to supply a pulse of fluid under pressure through said radially facing fluid communication means only during an initial entry of said disk separator into said stack.

66. The signal storage apparatus set forth in claim 64 further including means circumferentially adjacent said stack mounting said disk separator for pivoting action into and out of said stack and a given point on said disks rotates past said pivot means upstream from said disk separator for facilitating stack entry.

67. The signal storage apparatus set forth in claim 64 wherein said signal transducing means is mounted inside said disk separator and has a transducing portion extending axially out of said disk separator for dimpling into an adjacent disk whenever said disk separator is in an access opening of said stack of disks.

68. The signal storage apparatus set forth in claim 64 further including surface means integral with said disk separator for stabilizing at least one disk not subjected to said primary bending mode partial axial separation, said stabilizing integral surface means being coextensive and contiguous with said entry portion of said disk separator.

69. The signal storage apparatus set forth in claim 64 further including:
  an air supply;
  fluid communication means in said disk separator connected to said air supply; and
  said disk separator having a plurality of fluid communication ports in fluid communication with said fluid communication means and disposed adjacent an entry edge portion thereof for supplying air under pressure to an access opening in said stack.

70. The signal storage apparatus set forth in claim 69 further including a pair of said fluid communication means in said disk separator, a first of said fluid communication means supplying fluid under a first pressure through ports adjacent an entry edge portion of said disk separator and a second one of said fluid communication means supplying fluid under a second pressure at least than said first pressure to ports in surfaces of said disk separator remote from said entry edge portion.

71. The signal storage apparatus set forth in claim 64 wherein said axial stack of compliant circular record disks has a predetermined axial spacing;
  a fixed rigid plate adjacent an axial end of an arbor supporting said record disk; and
  a plurality of additional circular compliant disks having an axial spacing different from the axial spacing of said record disk for accommodating flexure of said record disks.

72. The signal storage apparatus set forth in claim 64 wherein said disk separator includes a concave disk separating surface spaced from a planar disk-stabilizing surface, said stabilizing surface being substantially perpendicular to the axis of rotation of said stack;
  said signal transducing means having a transducing portion extending through said stabilizing surface from inside said disk separator; and
  said concave surface distending a radially outwardly opening acute angle with respect to said stabilizing surface for tending to reduce vibration of disks being separated by said separator including reducing a bough wave in a disk at a point therein radially inward of said entry edge portion.

73. The signal storage apparatus set forth in claim 64 wherein said disk separator is inserted into a stack such that an entry edge portion thereof lies along a chord of the circle describing said record disk, the chordal extent of said disk separator being greater than the chordal extent of said disks being separated at maximum radial penetration of said disk separator such that said disk separator substantially fills the space defining an access opening between the two disks being separated.

74. The signal storage apparatus set forth in claim 73 wherein said signal transducing means is integrally mounted inside said disk separator and having a signal transducing portion extending axially through a stabilizing surface on said disk separator for dimpling into a record disk to be transduced.

75. The signal storage apparatus set forth in claim 73 wherein the axial thickness of said disk separator along any line forming a chord in a circular one of said disks during insertion of said disk separator at any depth is constant along a given respective chordal line.

76. The signal storage apparatus set forth in claim 74 wherein said disk separator has two primary-bending-mode inducing surfaces disposed somewhat symmetrically about a plane perpendicular to said axis of rotation.

77. The method of accessing one of a plurality of commonly rotating coaxial flexible record disks in an axial stack of such record disks;
  the improvement including the following steps:
  inducing a primary bending mode in at least certain disks axially adjacent said one record disk for bending a chord-defined segment in each said certain record disks axially away from said one record disk to form a chordal opening; and
  moving a transducing element into said chordal opening and to said one disk for transducing operations.

78. The method set forth in claim 77 further including the steps of:

maintaining said primary bending mode while performing transducing operations on said one record disk; and continuously stabilizing rotational movement of said one record disk toward a given plane transverse to an axial of rotation of said commonly rotating record disks while said primary bending mode is induced in said certain disks.

79. The method set forth in claim 77 further including the step of inducing said primary bending mode in disks on both axial sides of said chordal opening and exchanging signals with either of said disks bounding said chordal opening.

80. The method of creating a transducing access opening between two axially adjacent compliant circular coaxial record disks commonly rotating in a first rotational sense about a common axis of rotation,
including the steps of:
initiating a partial axial separation of said disks at a given circumferential location; and
then increasing such partial axial separation including additional axial separation along the circumference in the direction of said first rotational sense a greater circumferential distance than any additional axial separation along a circumference in a direction opposite to said first rotational sense.

81. The method set forth in claim 80 further including the step of establishing and maintaining transition lines demarking deflection of said partially axially separated disk segments along a chord of said disks, said line being along a given chord in accordance with depth of partial axial disk separation.

82. The method set forth in claim 81 further including the step of continuously stabilizing one of said disks adjacent said partial axial separation axially opposite said disks having said transition line.

83. The method set forth in claim 82 further including the step of maintaining said partial axially separated disk segments substantially along a plane intersecting said transition line at a small radially outwardly opening angle with respect to a remaining portion of said disks which is not partially axially separated.

84. The method set forth in claim 82 further including the step of applying axial stabilizing forces to said partial axially separated disk segment.

85. The method set forth in claim 82 further including the step of supplying fluid between said disks being separated from a radial inward location toward a radial outward location including supplying said fluid under differing pressure adjacent said transition line than remote from said transition line.

86. The method set forth in claim 82 further including the steps of:
limiting a radial outwardly opening angle between said partial axially separated segment and another disk adjacent said access opening to less than 17°; and
moving a transducer in said access opening simultaneously with creating said access opening to exchange signals with one disk adjacent said access opening.

87. The method of partially axially separating two axially adjacent, coaxial, commonly rotating, compliant, circular, record disks having a common coaxial support shaft,
the method steps including:
imposing radially inwardly moving, axially directed, chordally disposed, substantially isodynamic forces on a first record disk while simultaneously applying axially stabilizing forces to a second one of said axially adjacent record disks for facilitating transducing access to an axially facing record surface thereof, said axially stabilizing forces being in addition to any axial stabilization afforded by disk rotation.

88. The method of accessing a given record surface on a rotating circular flexible record disk, a plurality of rotating flexible disks axially adjacent, coaxial with, and facing said record surface,
the method including the steps of:
inducing a primary bending mode in said axially adjacent disks such that at one circumferential location a radially outward facing access opening occurs; and
exchanging signals with said record surface via said access opening.

89. For use with a signal storage apparatus having flexible record disks, a combination compliant disk separator and transducer mount,
including in combination:
a wedge-shaped body having an elongated entry edge portion with a given radius of curvature tansverse to its elongation;
a disk-stabilizing surface being one surface portion of said body coterminous with said entry edge portion;
a disk-separating surface being a second surface portion of said body coterminous with said entry edge portion and distending an acute angle with respect to said disk-stabilizing surface; and
a transducer assembly mounted in said body intermediate said surface portions remote from said entry edge portion being in a predetermined juxtaposition to said entry edge portion, and having a transducing portion extending through said stabilizing surface to outside said body.

90. The compliant disk separator and transducer mount set forth in claim 89 wherein said surfaces have a trapezoidal shape with said elongated entry edge portion being the longer of two parallel edges and which are substantially straight; and
said disk-stabilizing surface being substantially planar.

91. The combination disk separator and transducer mount set forth in claim 89 further including means adjacent one end of said elongated entry edge portion having means for mounting said body; and
said transducer assembly being disposed in said body adjacent an end of said entry edge portion opposite said first-mentioned end.

92. The combination disk separator and transducer mount set forth in claim 91 wherein said another end has an edge forming an acute angle with respect to said entry edge portion;
said entry edge portion having an initial entry point; and
said transducer assembly being disposed intermediate that portion of the body subtended by said another end edge and said initial entry point.

93. The combination disk separator and transducer mount set forth in claim 92 wherein said disk-separating surface has a concave, outwardly opening shape;
said concave disk-separating surface being a curved plane about a line extending parallel to said entry edge portion and displaced from said body such that spacing between said surfaces along lines substantially parallel to said entry edge portion are spaced an equal distance.

94. The combination disk separator and transducer mount set forth in claim 89 further including in combination:
fluid communication means inside said body;
said elongated entry edge portion and a portion of said disk-stabilizing surface coextensive with said entry edge portion having a pluralilty of fluid communication ports extending therethrough and in fluid communication with said fluid communication means; and
said disk-separating surface remote from said entry edge portion having fluid communication ports in fluid communication with said fluid communication means such that fluid emanating from said ports in said remote disk-separating surface creates a lower pressure than fluid emanating from ports in juxtaposition to said entry edge portion.

95. The combination disk separator and transducer mount set forth in claim 94 wherein said disk-stabilizing surface has fluid communication ports in fluid communication with said fluid communication means except in immediate juxtaposition to said transducer assembly.

96. The combination disk separator and transducer mount set forth in claim 95 wherein said entry edge portion has an initial entry point with fluid communication ports opening along a line, if extended, to lie between said surfaces and being in fluid communication with said fluid communication means.

97. The combination disk separator and transducer mount set forth in claim 89 wherein said entry edge portion has an initial entry point;
fluid communication means in said body and extending outwardly through said body at said initial entry point such that fluid therefrom would have a portion flowing in a substantial parallel relationship to said stabilizing surface; and
said transducer assembly being located along said entry edge portion intermediate said initial entry point and one end of said entry edge portion which is a greater distance from said initial entry point than another of said ends displaced from said initial entry point.

98. The combination disk separator and transducer mount set forth in claim 97 further including means at said one end close to said initial entry point for mounting said body for pivoting action and said initial entry point being closer to said mount than to said transducer assembly.

99. The combination disk separator and transducer mount set forth in claim 98 wherein said end most remote from said initial entry point is truncated at an angle acute with respect to said entry edge portion elongated extent.

100. The combination disk separator and transducer mount set forth in claim 89 wherein both said surfaces are substantially planar and distend an angle of not greater than 17° with the extent of said surfaces along said entry edge portion being greater than an extent transverse to said elongated direction of said entry edge portion; and
said transducer assembly being located closer to one end of said entry edge portion than another end thereof.

101. The combination disk separator and transducer mount set forth in claim 89 wherein said transducer assembly is mounted midway between the ends of said elongated entry edge portion.

102. The combination disk separator and transducer mount set forth in claim 101 wherein the shapes of said surfaces are trapezoidal.

103. The combination disk separator and transducer mount set forth in claim 101 further including fluid communication means in said body and extending through said entry edge portion midway between the ends thereof and including means directing fluid therefrom along a line substantially parallel to said disk-stabilizing surface extent in juxtaposition to said entry edge portion.

104. The combination disk separator and transducer mount set forth in claim 89 wherein said transducer assembly includes a transducer portion extending outwardly from each said surface in said predetermined juxtaposition to said entry edge portion.

105. The combination disk separator and transducer mount set forth in claim 89 further including in combination:
adjustable mounting means in said body aligned with a line transverse to said elongated entry portion and extending through said transducer assembly;
resilient leaf springs extending from said adjustable mounting means to and supporting said transducer assembly inside said body; and
said stabilizing surface having an aperture for movably receiving said transducer portion for permitting it to move therethrough in accordance with the adjustments of said adjustable mounting means.

106. The combination disk separator and transducer mount set forth in claim 105 further including adjustment control means in said adjustable mounts accessible outside said body for adjusting said transducer assembly without disassembling said combination disk separator and transducer mount.

107. For use with a signal storage apparatus having flexible record disks, a combination compliant disk separator and transducer mount,
including in combination:
a body having a wedge-shaped portion having an elongated leading edge portion and a pair of flexible disk stabilizing surfaces coextensive therewith and extending therefrom in a manner to distend an acute angle; and
a transducer assembly mounted on said body and having a transducing portion extending outwardly from one of said surfaces in a predetermined juxtaposition to said entry edge portion.

108. A combination disk separator and transducer mount as set forth in claim 107 further including a plurality of said transducer assemblies each mounted on said body and having a transducing portion extending outwardly from a surface in a different predetermined juxtaposition to said leading edge portion.

109. The combination disk separator and transducer mount set forth in claim 107 further including fluid communication means in said body; and
one of said stabilizing surfaces having a plurality of ports in fluid communication with said fluid communication means including means for establishing different fluid flows at different portions of said surfaces with a greater fluid flow in juxtaposition and coextensive with said elongated leading edge portion.

110. A combination disk separator and transducer mount set forth in claim 107 wherein said elongated entry edge portion has an initial entry portion; and
means at said initial entry point for separating flexible disks to be separated independent of said disk-stabilizing surface.

111. A combination disk separator and transducer mount set forth in claim 110 wherein said entry point means includes fluid communication ports for directing a jet of fluid in substantial parallel relationship to one of said disk-stabilizing surfaces; and
fluid communication means inside said body in fluid communication with said port.

112. A combination disk separator and transducer mount set forth in claim 107 further including transducer assembly mounting means inside said body including an adjustable mount portion secured to said body intermediate said stabilizing surface and opposite said elongated entry edge portion and including independent means extending from said mounting means inside said body independent thereof to support said transducer assembly; and
said one surface having an aperture for movably receiving said transducing portion for movements in and out of said body.

113. A combination disk separator and transducer mount set forth in claim 107 wherein said elongated entry edge portion has an initial entry point closer to one end thereof than another end thereof;
said transducer assembly mounted on said body longitudinally intermediate said another end portion and said initial entry point; and
means for mounting said body adjacent said one end of said elongated entry edge portion.

114. A combination disk separator and transducer mount set forth in claim 107 wherein said elongated entry edge portion has an initial entry point midway between its longitudinal ends; and
said transducer assembly mounted remote from said entry edge portion along a line perpendicular to said elongated entry edge longitudinal extent and intersecting said initial entry point.

115. A combination disk separator and transducer mount set forth in claim 107 wherein said surfaces are substantially planar and distend an angle of not greater than 17°; and
said elongated entry edge portion having a radius of curvature transverse to its longitudinal extent of substantially 0.010 inch.

116. A combination disk separator and transducer mount set forth in claim 115 wherein said distended angle is approximately in the range of 4° to 15°; and
said transducer assembly is mounted inside said body and has a transducing portion operating through said one surface.

117. For signal storage apparatus, a combination compliant member separator and transducer mount apparatus, including in combination:
a body having a wedge-shaped portion with an elongated substantially straight entry edge portion;
a first surface portion in said wedge-shaped portion and coextensive with said entry portion and extending therefrom along a plane contiguous with said entry portion;
a second surface portion in said wedge-shaped portion and coextensive with said entry edge portion and extending therefrom at a given angle with respect to said first surface portion and along a plane contiguous with said entry portion;

said entry edge portion having an initial entry point with fluid communication ports for directing fluid outwardly from said apparatus along a line which, if extended, would lie intermediate said surface portions; and
a transducer mounted inside said separator and having a transducing portion extending through said second surface portion remote from said entry edge portion and said fluid communication ports.

118. For use in a random-access signal storage apparatus having a coaxial stack of commonly rotating record disks, a combination disk separator and transducer mount,
including in combination:
a body having a pair of disk-separating surfaces joined along an elongated leading body edge and distending a given acute angle from said leading body edge; and
a transducer assembly in said body and having a transducing portion operative through one of said surfaces for enabling transducing operations with a record disk.

119. The combination disk separator and transducer mount set forth in claim 118 wherein said body has a trailing edge portion truncating said surfaces in a given spaced-apart relation.

120. The combination disk separator and transducer mount set forth in claim 118 wherein said elongated leading body edge has an initial entry point; and
said body having an elongated trailing body edge aligned with said elongated leading body edge such that disks being separated have a chord alignable with said aligned body edges.

121. The combination disk separator and transducer mount set forth in claim 118 wherein said one disk-separating surface is planar and another disk-separating surface has a predetermined arcuate shape for establishing a given disk-to-body separation relationship.

122. The combination disk aligned separator and transducer mount set forth in claim 121 wherein said arcuate shape yields a convex shape for said body such that disks being separated have a transition fold line remote and outwardly of said leading body edge.

123. A chord roll type disk separator for use with a random access signal storage apparatus having a plurality fo commonly rotating coaxial flexible record disks,
the improved chord roll type disk separator including in combination:
a first planar sheet having one longitudinal edge of greater length than another longitudinal edge;
a second sheet having a similar areal shape and extent as said first planar sheet and joined to said first planar sheet along said one longitudinal edge, said second sheet being coextensive with said one planar sheet at said one longitudinal edge;
said sheets subtending an acute angle from said one longitudinal edge;
means intermediate said sheets for stabilizing same, and substantially closing space therebetween along edges of said sheets;
a joining surface with a given radius of curvature extending between said sheet along and coextensively with said one longitudinal edge; and
support means connected to both said sheets remote from said one longitudinal edge.

124. The chord roll separator set forth in claim 123 further including fluid communication means intermediate said sheets;

said second sheet having fluid communication port means disposed adjacent and along said one longitudinal edge.

125. For a signal storage apparatus employing a stack of coaxial common axially supported circular record disks for being commonly rotated and accessed by deflecting a segment portion of selected ones of said disks, the improvement including in combination:
a stack of axially spaced-apart storage disks having a minimal axial spacing at the axial center of the stack and a maximum axial spacing between disks at an axial end of said stack; and
a rigid disk mounted for rotation with said flexible disk at said one axial end.

126. The improved stack set forth in claim 125 further including a second disk having a rigidity greater than said record disk at an axial end opposite to said one axial end and mounted for rotation with said disks.

127. The improved stack set forth in claim 125 wherein some of said record disks having a minimal spacing and some of said disks having a greater axial spacing with one of said plates having a greater rigidity being removable from said stack as a unit.

128. the stack set forth in claim 127 wherein each of said record disks has a magnetic coating on both axial sides thereof.

129. For a signal storage apparatus, a stack of coaxial commonly axially supported circular record disks, each said disk having a conformal substrate, an arbor extending coaxially through said stack and supporting said disks, the improvement including in combination:
a stack stabilizing means secured to said arbor at one axial end of said stack; and
a plurality of axially spaced-apart circular conformal disks on said arbor axially intermediate said record disks and said stack stabilizing means and being axially spaced apart a greater distance than axial spacing between said record disks.

130. The stack set forth in claim 129 further including a stack stabilizing means at each axial end of said stack and secured to said arbor at its respective axial extremities and two sets of said plurality of axially spaced-apart circular conformal disks on the arbor axially intermediate said record disks and said stack stabilizing means, respectively.

131. The stack set forth in claim 129 wherein said stack stabilizing means is a rigid circular plate attached to said arbor for rotation with said disk; and
fluid communication means in said arbor and connected to each axial space between each and every of said circular disks.

132. The stack set forth in claim 129 wherein said arbor is axially in two portions, one portion being removable from another portion and said stack stabilizing means and said plurality of axially spaced-apart circular conformal disks and some of said record disks being on said one portion.

133. For a signal storage apparatus, a stack of coaxial common axially supported circular record disks, each said disk having a conformal substrate, an arbor extending coaxially through said stack for supporting said disks, the improvement including in combination:
access enhancement means including spacers of variable axial lengths disposed between adjacent ones of said disks; and
means to stabilize said stack during rotation.

134. A combination disk stabilizer and transducer mount, including in combination:
first and second spaced apart disk stabilizing sheets, said sheets having elongated disk entry portions joined as an entry edge, and a transducer intermediate said sheets and having a transducing portion operative through one of said sheets.

135. The stabilizer and mount set forth in claim 134 wherein both said sheets having elongated and spaced apart trailing portions, and
said trailing and entry portions being elongated at an angle of not greater than 180° and which opens into said sheets.

* * * * *

UNITED STATES PATENT OFFICE
CERTIFICATE OF CORRECTION

PATENT NO. : 3,940,794
DATED : February 24, 1976
INVENTOR(S) : D. E. Griffiths, Joseph H. Koestner, David G. Norton It is certified that error appears in the above-identified patent and that said Letters Patent are hereby corrected as shown below:

Column 28, line 61, "least" should be --less--.

Column 29, line 49, delete "1".

Column 30, line 58, "had" should be --has--.

Column 31, line 11, "enterng" should be --entering--.

Column 34, line 2, "least" should be --less--.

Column 40, line 46 "fo" should be --of--.

Signed and Sealed this

Tenth Day of August 1976

[SEAL]

Attest:

RUTH C. MASON
Attesting Officer

C. MARSHALL DANN
Commissioner of Patents and Trademarks